United States Patent
Mizuno

(10) Patent No.: US 7,304,752 B2
(45) Date of Patent: Dec. 4, 2007

(54) JOB PROCESSING SYSTEM, NETWORK SYSTEM, CONTROL METHOD, AND STORAGE MEDIUM

(75) Inventor: Atsushi Mizuno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1095 days.

(21) Appl. No.: 09/826,938

(22) Filed: Apr. 6, 2001

(65) Prior Publication Data

US 2001/0029516 A1 Oct. 11, 2001

(30) Foreign Application Priority Data

Apr. 7, 2000 (JP) ............................ 2000-107126

(51) Int. Cl.
*G06F 15/00* (2006.01)
*G06F 7/04* (2006.01)
*G06F 9/46* (2006.01)

(52) U.S. Cl. .................... 358/1.14; 358/1.15; 719/318; 726/3; 726/21

(58) Field of Classification Search ................ 719/310, 719/318; 714/18, 201; 358/1.14, 1.15; 726/3, 726/21; 713/151, 152
See application file for complete search history.

(56) References Cited

U.S. PATENT DOCUMENTS

| | | | | |
|---|---|---|---|---|
| 5,633,932 A * | 5/1997 | Davis et al. ............... | 713/176 |
| 5,956,471 A * | 9/1999 | Ueda et al. ............... | 358/1.14 |
| 5,970,218 A * | 10/1999 | Mullin et al. ............... | 358/1.15 |
| 6,006,332 A * | 12/1999 | Rabne et al. ............... | 713/201 |
| 6,115,132 A * | 9/2000 | Nakatsuma et al. ........ | 358/1.14 |
| 6,229,620 B1 | 5/2001 | Makitani et al. ............ | 358/1.15 |
| 6,307,640 B1 * | 10/2001 | Motegi ...................... | 358/1.14 |
| 6,348,972 B1 * | 2/2002 | Taniguchi et al. .......... | 358/1.15 |
| 6,378,070 B1 * | 4/2002 | Chan et al. .................. | 713/155 |
| 6,385,728 B1 * | 5/2002 | DeBry .......................... | 726/9 |
| 6,542,261 B1 * | 4/2003 | McGraw ...................... | 358/434 |
| 6,711,677 B1 * | 3/2004 | Wiegley ...................... | 713/151 |
| 6,748,471 B1 * | 6/2004 | Keeney et al. .............. | 710/220 |
| 6,762,853 B1 * | 7/2004 | Takagi et al. ............... | 358/1.15 |
| 6,771,386 B1 * | 8/2004 | Kato ........................... | 358/1.15 |
| 6,806,976 B1 * | 10/2004 | Suyehira ..................... | 358/1.14 |
| 2002/0062453 A1 | 5/2002 | Koga .......................... | 713/202 |
| 2003/0007172 A1 | 1/2003 | Takayanagi ................. | 358/1.15 |

* cited by examiner

*Primary Examiner*—William Thomson
*Assistant Examiner*—Li Zhen
(74) *Attorney, Agent, or Firm*—Fitzpatrick, Cella, Harper & Scinto

(57) ABSTRACT

When a first user on a network is to provide information to a second user, this invention allows the second user to visually output the information even if an information processor used by the second user does not have a function of reading electronic data as a source of the information. In this invention, when information formed by a PC (111) on a network (110) is to be output to the user of a PC (103) on the network (100), the PC (111) issues a print job to a printer (102) and notifies the PC (103) of the issue. Upon receiving this notification, the PC (103) gives execution designation of the job to the printer (102). The print job is then executed, and the printed product is handed over to the user of the PC (103).

17 Claims, 33 Drawing Sheets

FIG. 12

OPERATIONS USED

| OPERATION | FUNCTION SUMMARY | SCRIPT SUMMARY |
|---|---|---|
| JobStart | START ISSUE OF JOB | SET JOB ATTRIBUTES BY SetJob AND TERMINATE SETUP BY JobEnd |
| SetJob | SET JOB ATTRIBUTES | SET JOB ATTRIBUTES NECESSARY FOR JOB AUTHENTICATION BY THIS OPERATION |
| Send | TRANSMIT PRINT DATA | |
| JobEnd | TERMINATE ISSUE OF JOB | |
| ExecuteJob | DESIGNATE EXECUTION OF JOB | DESIGNATE JOB EXECUTION TOGETHER WITH JOB ATTRIBUTES NECESSARY FOR JOB EXECUTION DESIGNATION AND JOB AUTHENTICATION BY THIS OPERATION |

FIG. 13

JobStart
[TRANSMISSION PACKET]

| Bit<br>Byte | 7 | 6 | 5 | 4 | 3 | 2 | 1 | 0 |
|---|---|---|---|---|---|---|---|---|
| 0~2 | Packet Header ID & Version |||||||||
| 3 | 0 | 0 | 0 | 0 | 0 | RqRep.<br>(1) | Cont.<br>(0) | Send<br>(0) |
| 4~5 | Operation Code=id_val_operation_job_start ||||||||
| 6~7 | Block Number=0x0001~0xFFFF ||||||||
| 8~9 | Parameter Length=0x0009 ||||||||
| 10~13 | User ID=0x00000000~0xFFFFFFFF ||||||||
| 14~17 | Password=0x00000000~0xFFFFFFFF ||||||||
| 18~19 | Status Code=0x0000 ||||||||
| 20~23 | Object Handle (JOB ID) ||||||||

[RETURN PACKET]

| Bit<br>Byte | 7 | 6 | 5 | 4 | 3 | 2 | 1 | 0 |
|---|---|---|---|---|---|---|---|---|
| 0~2 | Packet Header ID & Version |||||||||
| 3 | 0 | 0 | 0 | 0 | 0 | NoRep.<br>(0) | Cont.<br>(0/1) | Reply<br>(1) |
| 4~5 | Operation Code=id_val_operation_job_start ||||||||
| 6~7 | Block Number=0x0001~0xFFFF ||||||||
| 8~9 | Parameter Length=0x0004 ||||||||
| 10~13 | User ID=0x00000000~0xFFFFFFFF ||||||||
| 14~17 | Password=0x00000000~0xFFFFFFFF ||||||||
| 18~19 | Status Code=0x0000~0xFFFF ||||||||
| 20~23 | Object Handle (JOB ID) ||||||||

FIG. 14

SetJob
[TRANSMISSION PACKET]

| Bit<br>Byte | 7 | 6 | 5 | 4 | 3 | 2 | 1 | 0 |
|---|---|---|---|---|---|---|---|---|
| 0~2 | Packet Header ID & Version ||||||||
| 3 | 0 | 0 | 0 | 0 | 0 | RqRep.<br>(0/1) | Cont.<br>(0/1) | Send<br>(0) |
| 4~5 | Operation Code=id_val_operation_Set_job ||||||||
| 6~7 | Block Number=0x0001~0xFFFF ||||||||
| 8~9 | Parameter Length=0x0003~0xFFFF ||||||||
| 10~13 | User ID=0x00000000~0xFFFFFFFF ||||||||
| 14~17 | Password=0x00000000~0xFFFFFFFF ||||||||
| 18~19 | Status Code=0x0000 ||||||||
| 20~21 | Attribute ID=0x0000~0xFFFF ||||||||
| 22~ | Attribute Data=ANY ||||||||

[RETURN PACKET]

| Bit<br>Byte | 7 | 6 | 5 | 4 | 3 | 2 | 1 | 0 |
|---|---|---|---|---|---|---|---|---|
| 0~2 | Packet Header ID & Version ||||||||
| 3 | 0 | 0 | 0 | 0 | 0 | NoRep.<br>(0) | Cont.<br>(0/1) | Reply<br>(1) |
| 4~5 | Operation Code=id_val_operation_Set_job ||||||||
| 6~7 | Block Number=0x0001~0xFFFF ||||||||
| 8~9 | Parameter Length=0x0003~0xFFFF ||||||||
| 10~13 | User ID=0x00000000~0xFFFFFFFF ||||||||
| 14~17 | Password=0x00000000~0xFFFFFFFF ||||||||
| 18~19 | Status Code=0x0000~0xFFFF ||||||||
| 20~21 | Attribute ID=0x0000~0xFFFF ||||||||
| 22~ | Attribute Data=ANY ||||||||

FIG. 15

Send
[TRANSMISSION PACKET]

| Bit<br>Byte | 7 | 6 | 5 | 4 | 3 | 2 | 1 | 0 |
|---|---|---|---|---|---|---|---|---|
| 0~2 | Packet Header ID & Version ||||||||
| 3 | 0 | 0 | 0 | 0 | 0 | RqRep.<br>(0/1) | Cont.<br>(0/1) | Send<br>(0) |
| 4~5 | Operation Code=id_val_operation_send ||||||||
| 6~7 | Block Number=0x0000~0xFFFF ||||||||
| 8~9 | Parameter Length=0x0002~0xFFFF ||||||||
| 10~13 | User ID=0x00000000~0xFFFFFFFF ||||||||
| 14~17 | Password=0x00000000~0xFFFFFFFF ||||||||
| 18~19 | Status Code=0x0000 ||||||||
| 20~21 | Send Mode=0x00~0xFF ||||||||
| 22~ | Send Source=ANY ||||||||

[ANSWER PACKET]

| Bit<br>Byte | 7 | 6 | 5 | 4 | 3 | 2 | 1 | 0 |
|---|---|---|---|---|---|---|---|---|
| 0~2 | Packet Header ID & Version ||||||||
| 3 | 0 | 0 | 0 | 0 | 0 | NoRep.<br>(0) | Cont.<br>(0) | Reply<br>(1) |
| 4~5 | Operation Code=id_val_operation_send ||||||||
| 6~7 | Block Number=0x0000~0xFFFF ||||||||
| 8~9 | Parameter Length=0x0000 ||||||||
| 10~13 | User ID=0x00000000~0xFFFFFFFF ||||||||
| 14~17 | Password=0x00000000~0xFFFFFFFF ||||||||
| 18~19 | Status Code=0x0000~0xFFFF ||||||||

FIG. 16

JobEnd
[TRANSMISSION PACKET]

| Bit<br>Byte | 7 | 6 | 5 | 4 | 3 | 2 | 1 | 0 |
|---|---|---|---|---|---|---|---|---|
| 0~2 | Packet Header ID & Version ||||||||
| 3 | 0 | 0 | 0 | 0 | 0 | RqRep.<br>(0/1) | Cont.<br>(0) | Send<br>(0) |
| 4~5 | Operation Code=id_val_operation_job_end ||||||||
| 6~7 | Block Number=0x0001~0xFFFF ||||||||
| 8~9 | Parameter Length=0x0001 ||||||||
| 10~13 | User ID=0x00000000~0xFFFFFFFF ||||||||
| 14~17 | Password=0x00000000~0xFFFFFFFF ||||||||
| 18~19 | Status Code=0x0000 ||||||||
| 20 | Control Flag=0x0001 ||||||||

[RETURN PACKET]

| Bit<br>Byte | 7 | 6 | 5 | 4 | 3 | 2 | 1 | 0 |
|---|---|---|---|---|---|---|---|---|
| 0~2 | Packet Header ID & Version ||||||||
| 3 | 0 | 0 | 0 | 0 | 0 | NoRep.<br>(0) | Cont.<br>(0/1) | Reply<br>(1) |
| 4~5 | Operation Code=id_val_operation_job_end ||||||||
| 6~7 | Block Number=0x0001~0xFFFF ||||||||
| 8~9 | Parameter Length=0x0005 ||||||||
| 10~13 | User ID=0x00000000~0xFFFFFFFF ||||||||
| 14~17 | Password=0x00000000~0xFFFFFFFF ||||||||
| 18~19 | Status Code=0x0000~0xFFFF ||||||||
| 20 | Control Flag=0x00~0x01 ||||||||
| 21~24 | Object Handle=0x00000000~0xFFFFFFFF ||||||||

FIG. 17

ExecuteJob
[TRANSMISSION PACKET]

| Bit / Byte | 7 | 6 | 5 | 4 | 3 | 2 | 1 | 0 |
|---|---|---|---|---|---|---|---|---|
| 0~2 | Packet Header ID & Version ||||||||
| 3 | 0 | 0 | 0 | 0 | 0 | RqRep. (0/1) | Cont. (0) | Send (0) |
| 4~5 | Operation Code=id_val_operation_execute_job ||||||||
| 6~7 | Block Number=0x0001~0xFFFF ||||||||
| 8~9 | Parameter Length=0x0004 ||||||||
| 10~13 | User ID=0x00000000~0xFFFFFFFF ||||||||
| 14~17 | Password=0x00000000~0xFFFFFFFF ||||||||
| 18~19 | Status Code=0x0000 ||||||||
| 20~23 | Object Handle (JOB ID) ||||||||
| 24~25 | Attribute ID=0x0000~0xFFFF ||||||||
| 26~ | Attribute Data=ANY ||||||||

[RETURN PACKET]

| Bit / Byte | 7 | 6 | 5 | 4 | 3 | 2 | 1 | 0 |
|---|---|---|---|---|---|---|---|---|
| 0~2 | Packet Header ID & Version ||||||||
| 3 | 0 | 0 | 0 | 0 | 0 | NoRep. (0) | Cont. (0) | Reply (1) |
| 4~5 | Operation Code=id_val_operation_execute_job ||||||||
| 6~7 | Block Number=0x0001~0xFFFF ||||||||
| 8~9 | Parameter Length=0x0008 ||||||||
| 10~13 | User ID=0x00000000~0xFFFFFFFF ||||||||
| 14~17 | Password=0x00000000~0xFFFFFFFF ||||||||
| 18~19 | Status Code=0x0000~0xFFFF ||||||||
| 20~23 | Object Handle (JOB ID) ||||||||

FIG. 18

JOB ATTRIBUTES USED

| CLASSIFICATION | ATTRIBUTE | ATTRIBUTE IDENTIFIER |
|---|---|---|
| JOB ATTRIBUTES | JOB NAME | id_att_job_name |
| | TIME OF JOB SUBMISSION BY CLIENT | id_att_job_submission_time_on_client |
| | JOB ISSUER | id_att_job_originator |
| | JOB RECIPIENT | id_att_job_owner |
| | JOB PASSWORD | id_att_job_password |

JOB DATA TRANSMISSION SEQUENCE FOR JOB ISSUE

COMMAND DATA TRANSMISSION
SEQUENCE FOR JOB EXECUTION DESIGNATION

FIG. 22

| JOB ID | RECEPTION TIME | ISSUER | PASSWORD | RECIPIENT | PRINT DATA | |
|---|---|---|---|---|---|---|
| 00011 | 2000 / 02 / 10 10:45:15 | ×××  | # # # | AAA (0), BBB (0), CCC (0) | 00011.PRN | ~202a |
| ¦ | ¦ | ¦ | ¦ | ¦ | ¦ | |
| ¦ | ¦ | ¦ | ¦ | ¦ | ¦ | |

FIG. 29

OPERATIONS USED

| OPERATION | FUNCTION SUMMARY | SCRIPT SUMMARY |
|---|---|---|
| JobStart | START ISSUE OF JOB | SET JOB ATTRIBUTES BY SetJob AND TERMINATE SETUP BY JobEnd |
| SetJob | SET JOB ATTRIBUTES | SET JOB ATTRIBUTES NECESSARY FOR JOB AUTHENTICATION BY THIS OPERATION |
| Send | TRANSMIT PRINT DATA | |
| JobEnd | TERMINATE ISSUE OF JOB | |
| Set | CORRECT JOB ATTRIBUTE | CORRECT JOB ATTRIBUTE IN ALREADY FORMED JOB DATA BY THIS OPERATION |
| ExecuteJob | DESIGNATE EXECUTION OF JOB | DESIGNATE JOB EXECUTION TOGETHER WITH JOB ATTRIBUTES NECESSARY FOR JOB EXECUTION DESIGNATION AND JOB AUTHENTICATION BY THIS OPERATION |

FIG. 30

Set
[TRANSMISSION PACKET]

| Bit<br>Byte | 7 | 6 | 5 | 4 | 3 | 2 | 1 | 0 |
|---|---|---|---|---|---|---|---|---|
| 0~2 | Packet Header ID & Version ||||||||
| 3 | 0 | 0 | 0 | 0 | 0 | RqRep.<br>(0/1) | Cont.<br>(0/1) | Send<br>(0) |
| 4~5 | Operation Code=id_val_operation_set ||||||||
| 6~7 | Block Number=0x0001~0xFFFF ||||||||
| 8~9 | Parameter Length=0x0007~0xFFFF ||||||||
| 10~13 | User ID=0x00000000~0xFFFFFFFF ||||||||
| 14~17 | Password=0x00000000~0xFFFFFFFF ||||||||
| 18~19 | Status Code=0x0000 ||||||||
| 20~23 | Object Handle (JOB ID) ||||||||
| 24~25 | Attribute ID=0x0000~0xFFFF ||||||||
| 26~ | Attribute Data=ANY ||||||||

[RETURN PACKET]

| Bit<br>Byte | 7 | 6 | 5 | 4 | 3 | 2 | 1 | 0 |
|---|---|---|---|---|---|---|---|---|
| 0~2 | Packet Header ID & Version ||||||||
| 3 | 0 | 0 | 0 | 0 | 0 | NoRep.<br>(0) | Cont.<br>(0/1) | Reply<br>(1) |
| 4~5 | Operation Code=id_val_operation_set ||||||||
| 6~7 | Block Number=0x0001~0xFFFF ||||||||
| 8~9 | Parameter Length=0x0006~0xFFFF ||||||||
| 10~13 | User ID=0x00000000~0xFFFFFFFF ||||||||
| 14~17 | Password=0x00000000~0xFFFFFFFF ||||||||
| 18~19 | Status Code=0x0000~0xFFFF ||||||||
| 20~23 | Object Handle (JOB ID) ||||||||
| 24~25 | Attribute ID=0x0000~0xFFFF ||||||||
| 26~ | Attribute Data=ANY ||||||||

FIG. 31

JOB ATTRIBUTES USED

| CLASSIFICATION | ATTRIBUTE | ATTRIBUTE IDENTIFIER |
|---|---|---|
| JOB ATTRIBUTES | JOB NAME | id_att_job_name |
| | TIME OF JOB SUBMISSION BY CLIENT | id_att_job_submission_time_on_client |
| | JOB ISSUER | id_att_job_originator |
| | JOB RECIPIENT | id_att_job_owner |
| | JOB VALIDITY PERIOD | id_att_job_discard_time |
| | THE NUMBER OF EXECUTABLE TIMES OF JOB | id_att_job_available_count |
| | JOB PASSWORD | id_att_job_passward |

COMMAND DATA TRANSMISSION
SEQUENCE FOR JOB ATTRIBUTE CORRECTION

JOB PROCESSING SYSTEM, NETWORK SYSTEM, CONTROL METHOD, AND STORAGE MEDIUM

FIELD OF THE INVENTION

The present invention relates to a job processing system, network system, control method of the systems, and storage medium.

BACKGROUND OF THE INVENTION

Recently, local area networks (LANs) connecting computers are widely used. Such local area networks can be constructed on a floor of a building or in an entire building, across buildings (in premises), in a local area, or in a larger area. These networks are further connected to form a worldwide network, the so-called "Internet".

Computer peripheral devices such as printers and facsimile apparatuses are often connected to LANs and the Internet in addition to computers. These computer peripheral devices can be used from computers via networks.

Computer peripheral devices are generally fewer than computers or users using computers and shared by a plurality of computers or users.

A document formed on a certain computer of a network is usually transferred to another person by one of the following two means:

A sender prints out the document and transfers or mails the printed product to another person.

A sender transfers an electronic file (document file) of the formed document to a recipient, or transfers a medium storing the electronic file to the recipient, and asks the recipient to output the document.

Unfortunately, the former means is lacking instantaneousness, and sending the output result generally requires high cost.

The latter means has the problem that the application used to form the document file must be installed in the destination apparatus.

To solve the above problems, it is possible to transmit or output data to a printer or facsimile apparatus near the recipient and informs the recipient by telephone or the like. However, this means still has the following problems:

Since the computer peripheral device outputs the data regardless of the condition of the recipient, the output result may be seen by a person other than the recipient. This makes the means lacking in secrecy.

Likewise, since the computer peripheral device outputs the data regardless of the condition of the recipient, many output sheets build up on an output tray of the computer peripheral device.

SUMMARY OF THE INVENTION

The present invention has been made in consideration of the above situation, and has as its object to provide a job processing system, network system, control method of the systems, and storage medium which, when a first user on a network is to provide information to a second user, allow the second user to visually output the information even if an information processor used by the second user does not have a function of reading electronic data as a source of the information.

To achieve the above object, a job processing system of the present invention has the following arrangement.

A job processing system comprises a single network or different networks connected to be able to communicate with each other, first and second information processors, and an output device, wherein the first information processor comprises job issuing means for converting image information into print data processable by the output device, and transferring to the output device job data having attribute information attached which is used to start outputting the print data when the print data is given authentication from the second information processor, and notifying means for notifying the second information processor of execution designation information for the job data to be issued from the second information processor to the output device, the output device comprises storage means for storing received job data, and control means for outputting job data stored in the storage means when execution designation information for the job data is supplied, and the second information processor comprises job start designating means for designating actual issue of the execution designation information to the output device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a view showing operations used in job data and job execution designation command data according to the first and second embodiments;

FIG. 13 is a view showing details of the data structure of each operation;

FIG. 14 is a view showing details of the data structure of each operation;

FIG. 15 is a view showing details of the data structure of each operation;

FIG. 16 is a view showing details of the data structure of each operation;

FIG. 17 is a view showing details of the data structure of each operation;

FIG. 18 is a view showing job attributes used in job data and job execution designation command data;

FIG. 22 is a view showing an example of the contents of a job management table shown in FIG. 21;

FIG. 29 is a view showing operations used in job data and job execution designation command data according to the third embodiment;

FIG. 30 is a view showing the structure of job correction command data added in the third embodiment;

FIG. 31 is a view showing job attributes used in job data and job execution designation command data according to the third embodiment;

DETAILED DESCRIPTION OF THE PREFERRED EMBODIMENTS

Preferred embodiments of the present invention will now be described in detail in accordance with the accompanying drawings.

First Embodiment

A network system used by the embodiments of the present invention will be described below. In the following description, a personal computer (which can be a workstation) will be referred to as a PC.

Figure 2:
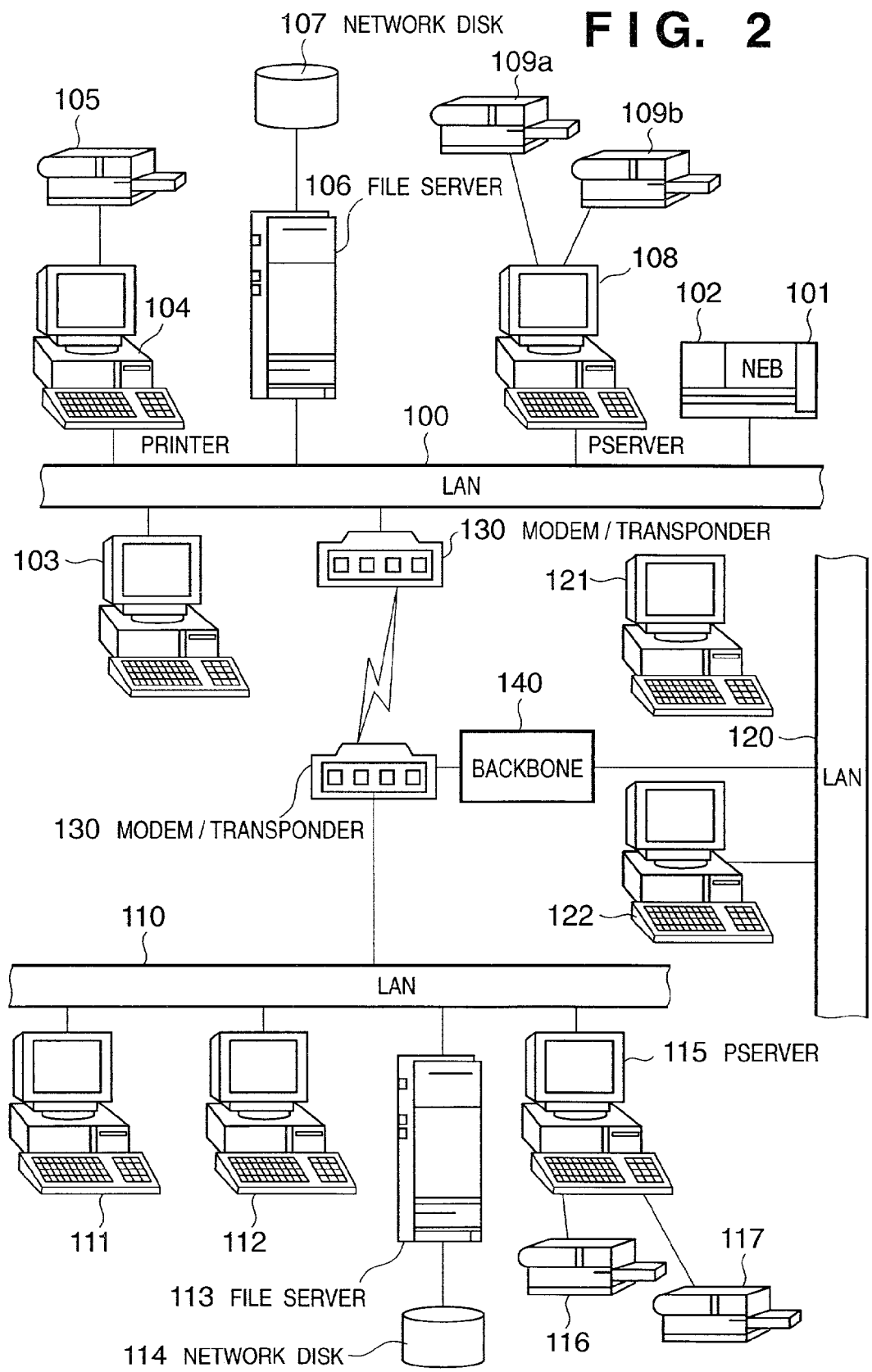
FIG. 2 is a view showing an example of a network configuration according to the embodiment.

FIG. 2 shows an example of the network system to which the embodiments are applied.

Referring to FIG. 2, a printer 102 having an open architecture has a network board (NB) 101 for connecting to a network. This NB 101 is connected to a local area network (LAN) 100 via a LAN interface such as the 10 Base-2 Ethernet interface having a coaxial connector or the 10 Base-T having RJ-45.

A plurality of personal computers (PCs) such as PCs 103 and 104 are also connected to the network 100. these PCs can communicate with the NB 101 under the control of the network operating system. Printers include those directly connected to the network, such as the printer 102, and those connected to PCs, such as a printer 105.

Usually, a LAN such as the LAN 100 provides services to a somewhat local user group such as a user group on one floor or on a plurality of successive floors in one building. When a user is present in, e.g., another building or in another prefecture, i.e., as a certain user moves away from other users, a wide area network (WAN) can also be formed. A WAN is basically a set of several LANs connected by a high-speed digital line such as the integrated services digital network (ISDN).

As shown in FIG. 2, therefore, the LAN 100, a LAN 110, and a LAN 120 form a WAN as they are connected via modem/transponders 130 and a backbone 140. These connections are simple electrical connections using a few buses. Each LAN includes dedicated PCs and usually includes a file server and print server, although they are not always necessary.

Accordingly, as shown in FIG. 2, the LAN 110 includes PCs 111 and 112, a file server 113, a network disk 114, a print server 115, and printers 116 and 117. In contrast, the LAN 120 includes only PCs 121 and 122. Devices connected to the LANs 100, 110, and 120 can access functions of other LAN devices via the WAN connections.

An example in which a PC on the network generates a job with respect to another device on the network in the above network environment will be explained below. More specifically, the PC 111 on the network 110 prints out data for a certain user on the network 100 by using the printer 101 on the network 100.

Figure 3:
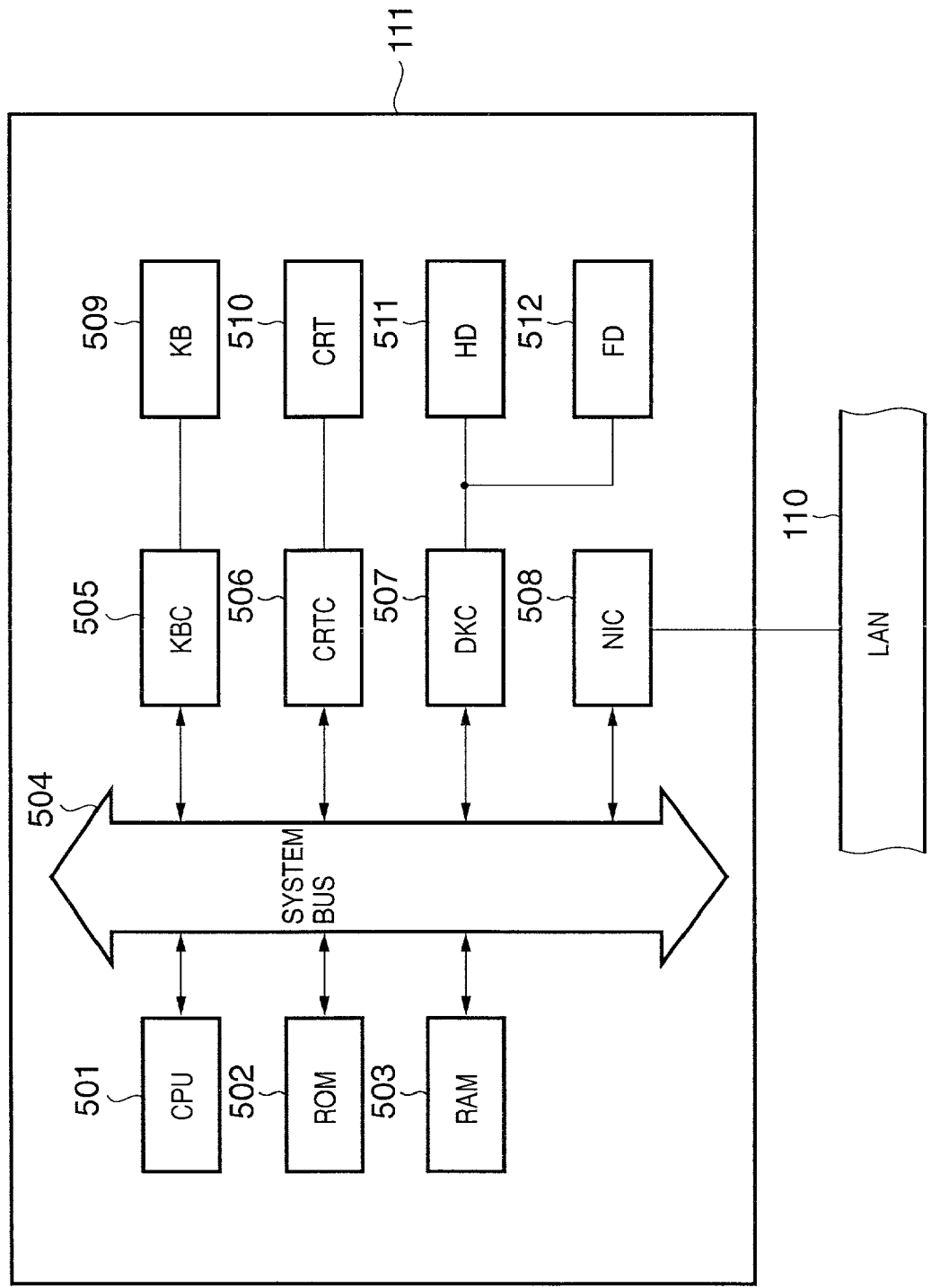
FIG. 3 is a block diagram of a personal computer according to the first embodiment.

FIG. 3 is a block diagram showing the configuration of a PC capable of running job generation software. Although all PCs have the same configuration, FIG. 3 shows the PC 111 for the sake of convenience.

This PC 111 includes a CPU 501 for executing job generation software stored in a ROM 502 or in a hard disk (HD) 511 or supplied from a floppy disk drive (FD) 512, and systematically controls devices connected to a system bus 504. A RAM 503 functions as a main memory, work area, and the like of the CPU 501.

A keyboard controller (KBC) 505 controls designation inputs from a keyboard (KB) 509 and, e.g., a pointing device (not shown). A CRT controller (CRTC) 506 controls a CRT display (CRT) 510. A disk controller (DKC) 507 controls accesses to the hard disk (HD) 511 and the floppy disk controller (FD) 512 storing a boot program, various applications, edit files, user files, a network management program, and the like. A network interface card (NIC) 508 bidirectionally exchanges data with an agent or a network device via the LAN 100.

As described previously, not only the PC 111 but also the other PCs have the above configuration.

<<Configuration of Job Generation Software>>

The configuration of job generation software in this embodiment will be described below.

A job generator of this embodiment is implemented on a PC, as shown in FIG. 3, capable of executing job generation software. The hard disk (HD) 511 stores a program of job generation software according to the present application, which is a main part of operations in all explanations given below. In all explanations given below, main hardware of execution is the CPU 501 unless otherwise specified. Also, main software of control is the job generation software stored in the hard disk (HD) 511.

The job generation software according to the present application can also be supplied as it is stored in a storage medium such as a floppy disk or CD-ROM. When this is the case, the program is read out from the floppy disk controller (FD) 512 shown in FIG. 3 or from a CD-ROM driver (not shown) and installed in the hard disk (HD) 511.

Figure 1:
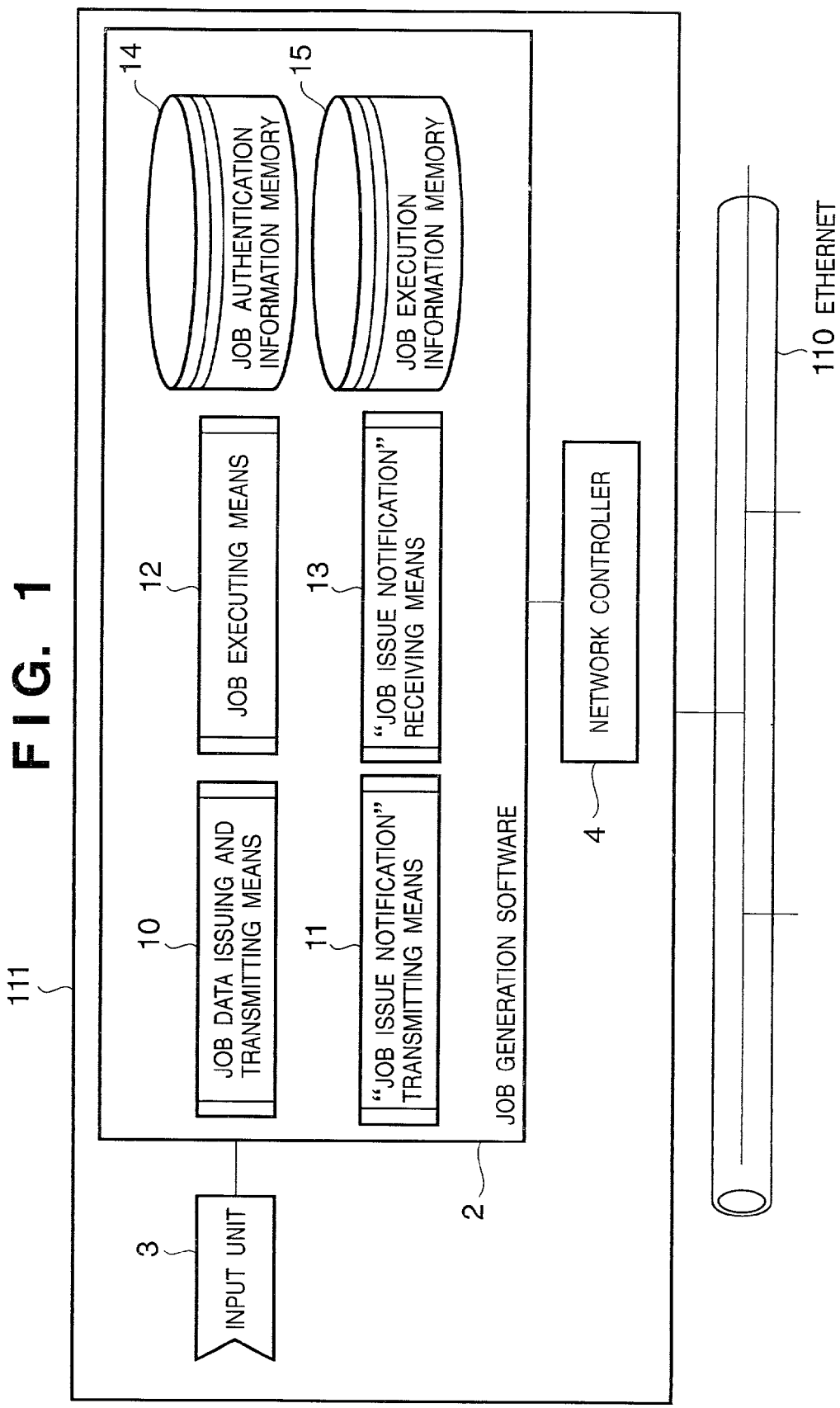
FIG. 1 is a conceptual view showing job generation software and its peripheral operation environment according to the first embodiment.

FIG. 1 is a conceptual view showing the PC 111 with the above arrangement as the job generation software and its peripheral functional portions. Note that the other PCs have the same configuration.

In FIG. 1, reference numeral 2 denotes the job generation software for designating job data issue and job data output. This job generation software 2 is stored in the hard disk 511 shown in FIG. 3 and executed by the CPU 501. The RAM 503 is used as a job authentication memory 14 and a job execution information memory 15 in the job generation software 2. This RAM 503 is also used as a work area by which the CPU 501 executes the job generation software.

An input unit 3 for transmitting user inputs to the job generation software is implemented by the keyboard controller 505 shown in FIG. 3. A network controller 4 controls a network protocol and a network board when the job generation software communicates with the network. This network controller 4 is implemented by the CPU 501 and the NIC 508.

In the above arrangement of this embodiment, software related to a job is activated on the PCs 111 and 103, and the PC 111 performs the job, i.e., printing (output), by using the printer 102 on the network to which the PC 103 is connected. This operation procedure will be described in detail below.

As a precondition before execution of the following processing, assume that the printer 102 has a job output function corresponding to this job generation software (details will be explained later).

First, an outline of the operation of this embodiment will be described with reference to FIGS. 1 and 4. As shown in FIG. 1, this job generation software is composed of:

A job issuing means 10
A "job issue notification" transmitting means 11
A "job issue notification" receiving means 12
A job execution designating means 13
The job authentication information memory 14
The job execution information memory 15

Figure 4:
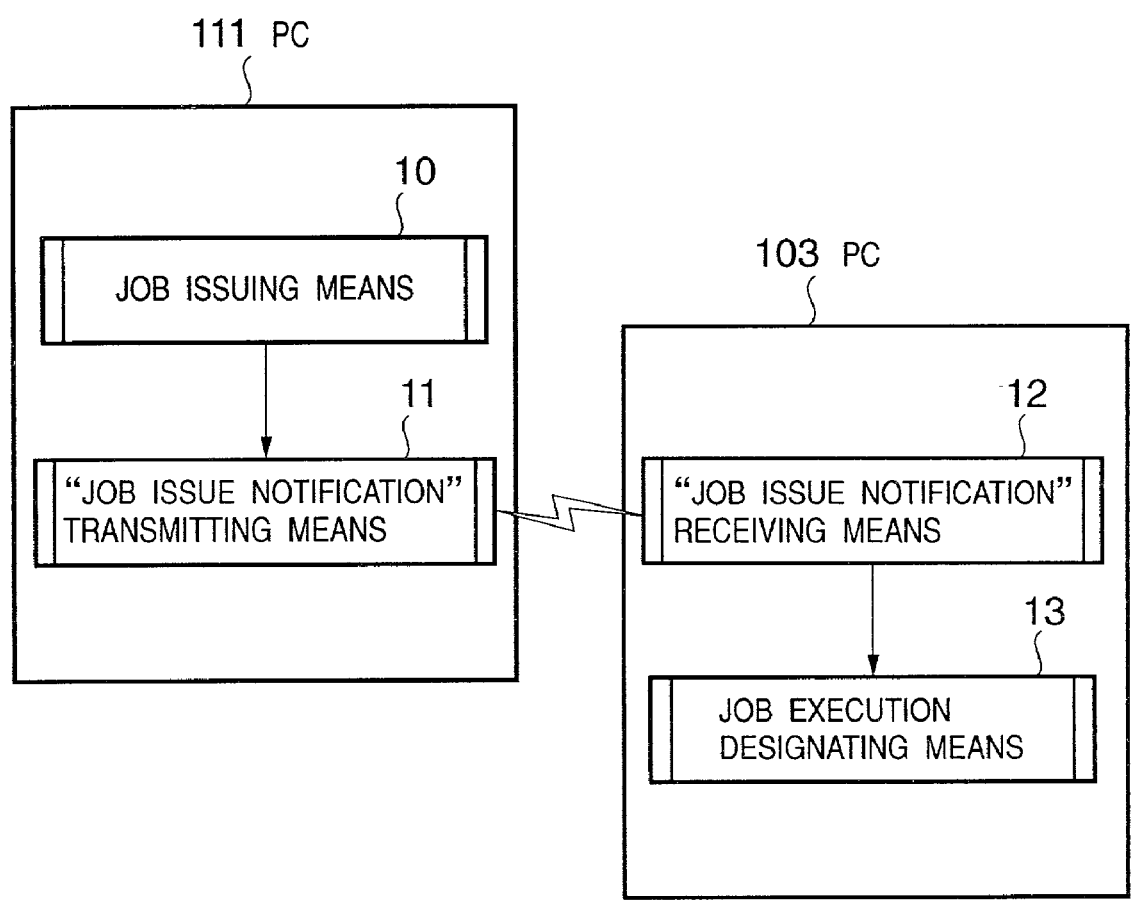
FIG. 4 is a schematic view showing the operation relationship of the job generation software according to the first embodiment.

In this embodiment, as shown in FIG. 4, the PC 111 executes the job issuing means (10) and the "job issue notification" transmitting means (11) in this order, and the PC 103 executes the "job issue notification" receiving means (12) and the job execution designating means (13) in this order. At the PC 111, a user A as a job issuer issues a job to a user B. At the PC 103, the user B as a job recipient designates execution of printing of the job.

The details of each means will be explained below.

Figure 5:
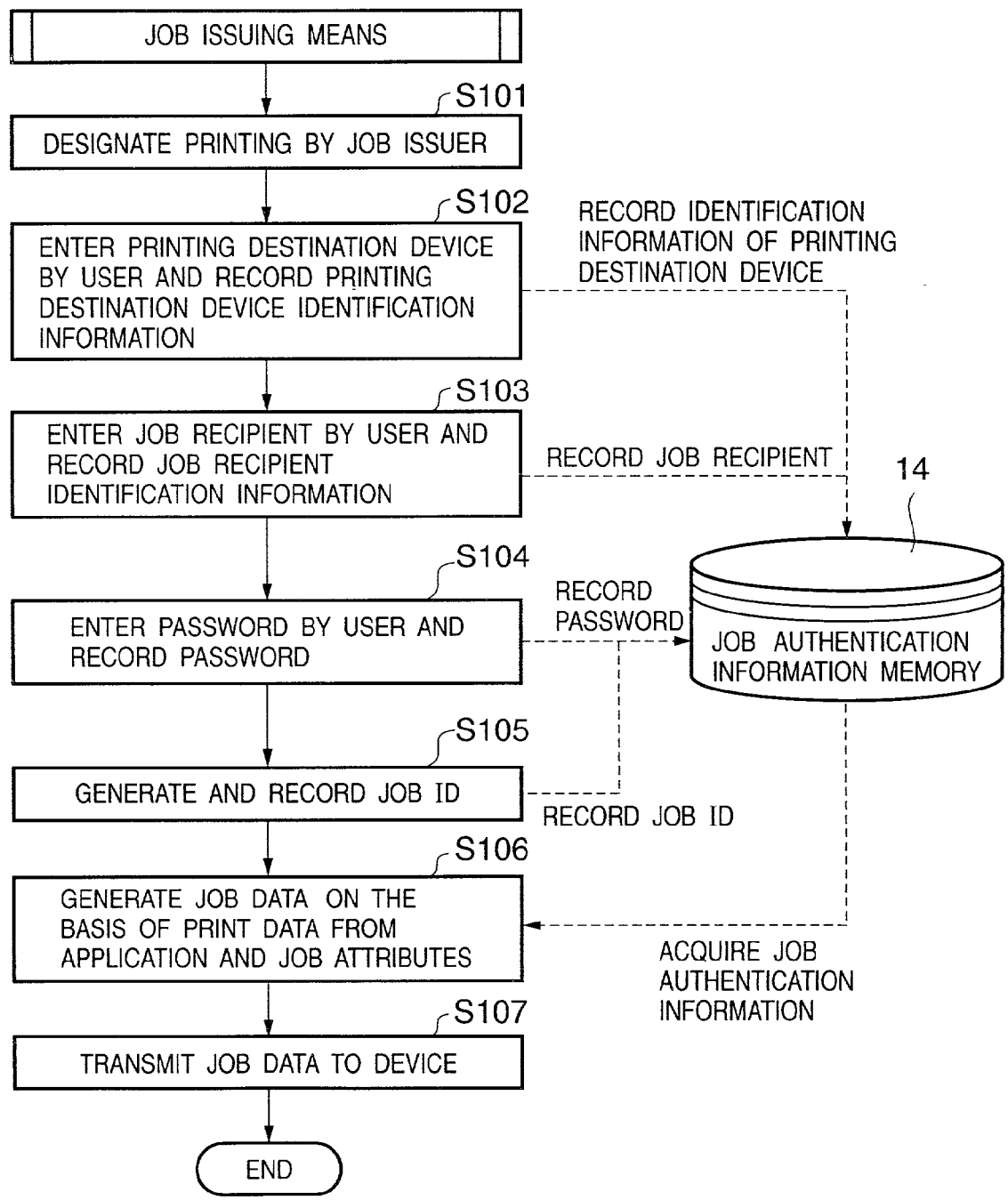
FIG. 5 is a flow chart showing the flow of processing of a job issuing means according to the first embodiment.

A flow chart in FIG. 5 shows the procedure in the job issuing means.

This job issuing means is easy to understand by assuming that it is incorporated into, e.g., a printer driver. That is, when printing is designated on an application, this triggers the operation.

First, in step S101, job issue designation (on an application currently being used) by user A=job issuer is input from the KBC 505. In the following description, any input from the user A is executed from the KBC 505.

In step S102, the user A enters information for identifying a device (in this case, the printer 102) as a transmission destination (printing destination) of the job data, and this printing destination device identification information is recorded in the job authentication information memory 14. As the printing destination device identification information, the IP address of the printing destination device or the name (if DNS is available) of the device on the network is used.

In step S103, the user A designates the recipient of the job and enters job recipient identification information, and this job recipient identification information is recorded in the job authentication information memory 14. To designate the job recipient, e-mail address book information or a list of network login names registered in, e.g., the server or the user group is used. As the job recipient identification information, an e-mail address or a login name is used. Note that a plurality of job recipients can be designated.

In step S104, the user A enters an arbitrary password for executing the job, and this password is recorded in the job authentication information memory 14. In step S105, a job ID for identifying the job currently being issued is generated and recorded in the job authentication information memory 14.

Figure 19:
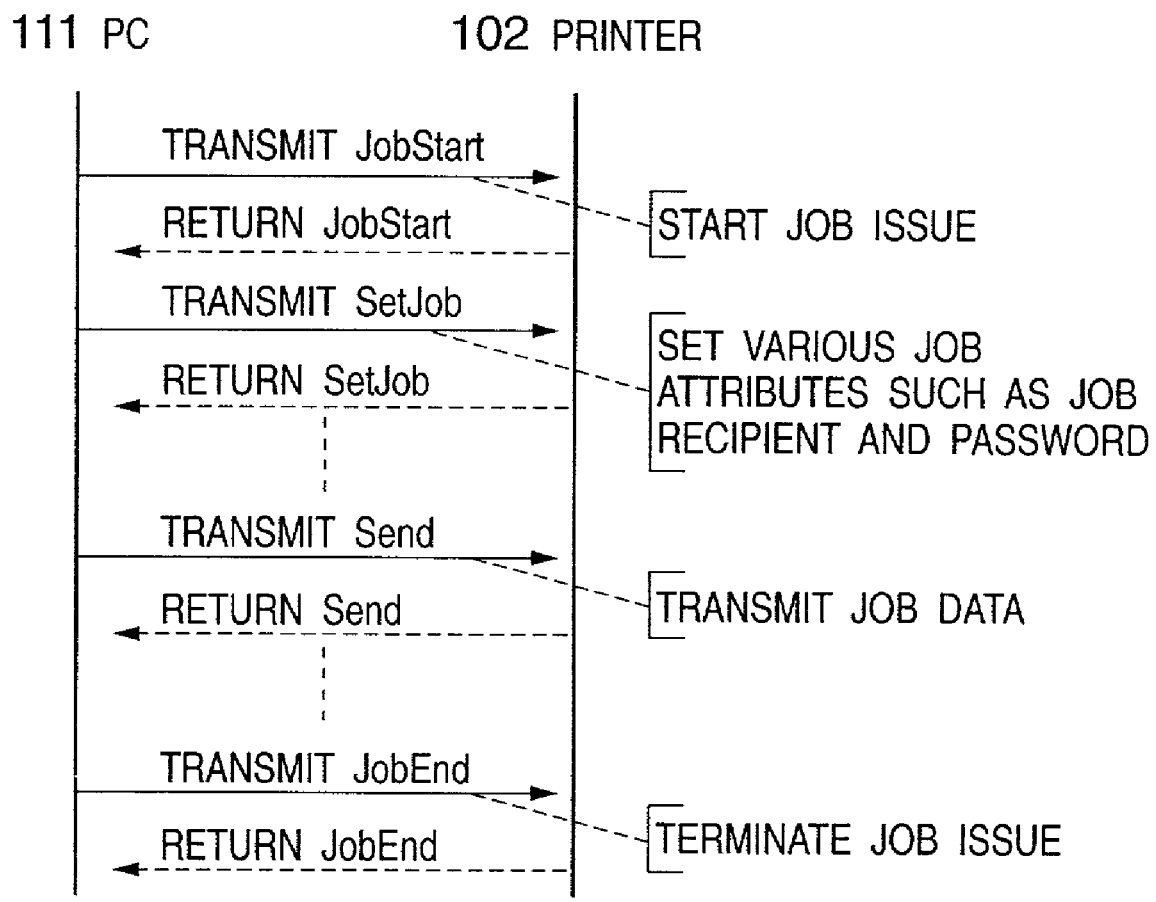
FIG. 19 is a view showing the transmission sequence of job data when a job is issued.

In step S106, job data (including print data converted into a printer language interpretable by the printer 102) is issued on the basis of a data main body to be printed, the above various pieces of information recorded in the job authentication information memory 14, and other job attributes (e.g., job issuer identification information and the job generation date and time). In step S107, this job data is transmitted to the printing destination device. The transmitted job data is stored in the printer 102 (the data structure of the job data issued in step S106 is shown in FIGS. 12 to 18, and the transmission sequence executed in step S107 is shown in FIG. 19).

Figure 6:
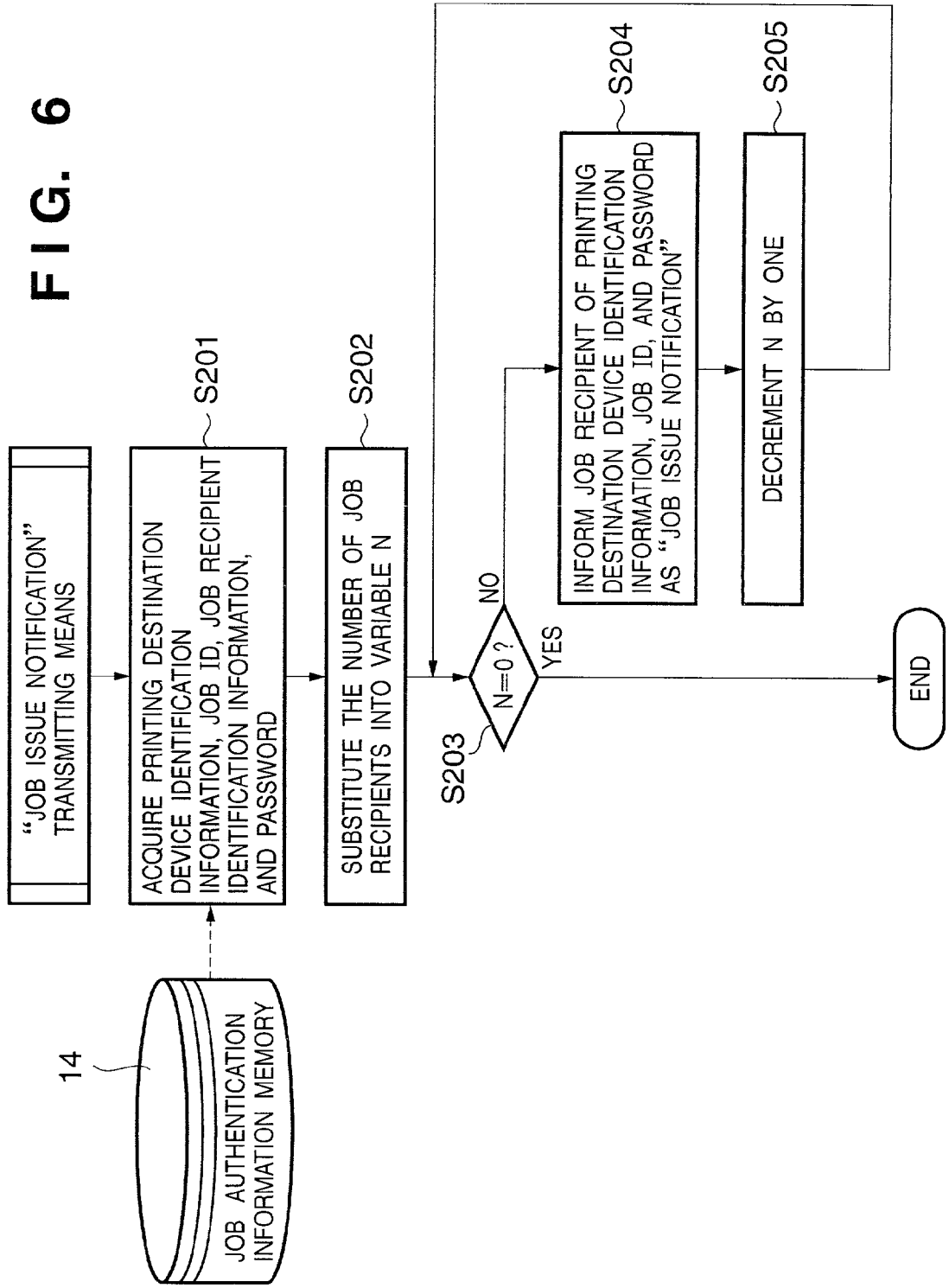
FIG. 6 is a flow chart showing the flow of processing of a "job issue notification" transmitting means according to the first embodiment.

The "job issue notification" transmitting means will be described below with reference to a flow chart in FIG. 6. This means is a procedure of transmitting a "job issue notification" for notifying the PC 103, from the PC 111, that the job is issued by the job issuing means.

First, in step S201, the printing destination device identification information, job ID, job recipient identification information, and password are acquired from the job authentication information memory 14.

In step S202, the number of job recipients is substituted into a variable N. If N≠0 in step S203, step S204 is executed. If N=0 in step S203, this means is terminated.

In step S204, the printing destination device identification information, job ID, and password are transmitted as a "job issue notification" across the network to the job recipient. A practical method of transmitting the "job issue notification" across the network is accomplished by using e-mail or messaging service of the server or the user group.

In step S205, the variable N is decremented by one, and the flow returns to step S203.

Figure 7:
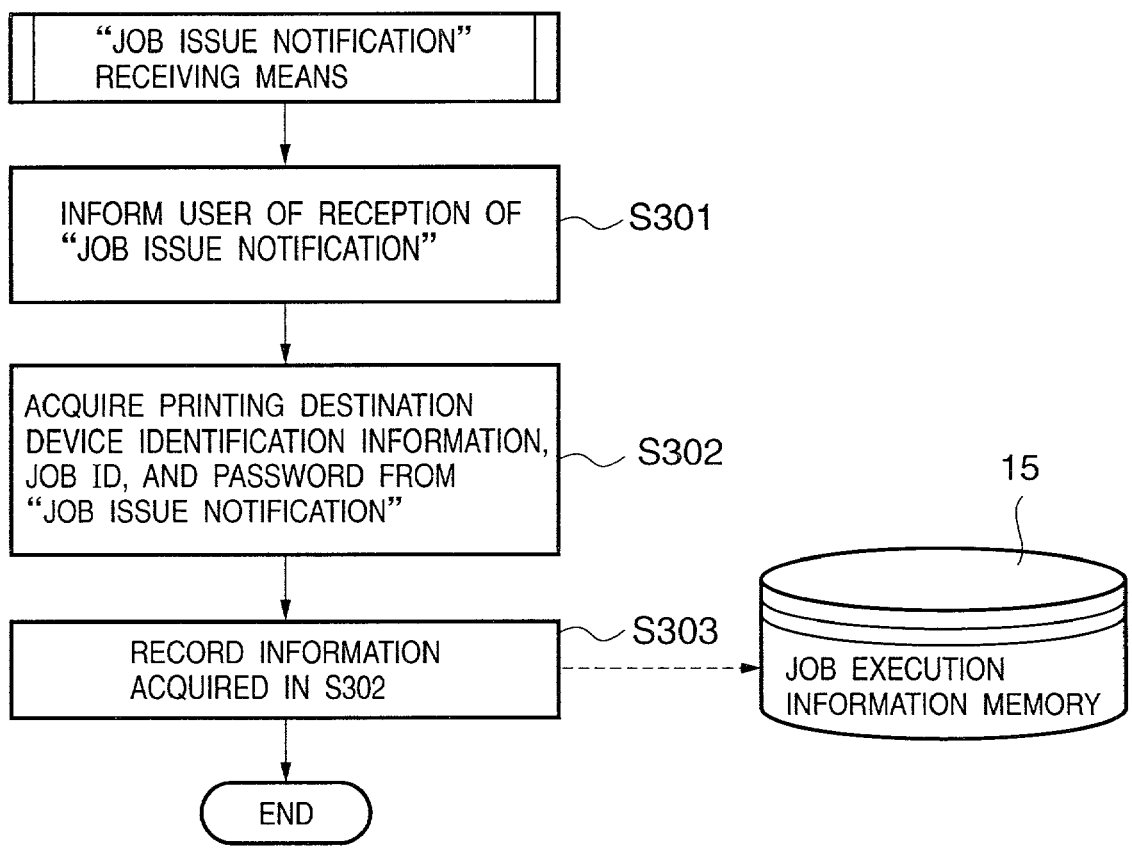
FIG. 7 is a flow chart showing the flow of processing of a "job issue notification" receiving means according to the first embodiment.

The "job issue notification" receiving means (of the PC 103 for the sake of easy understanding) will be described below with reference to a flow chart in FIG. 7.

In step S301, information indicating that the "job issue notification" is received is displayed to the user B.

In step S302, the printing destination device identification information, job ID, and password are acquired from the received "job issue notification".

In step S303, these pieces of acquired information are recorded in the job execution information memory 15.

Figure 8:
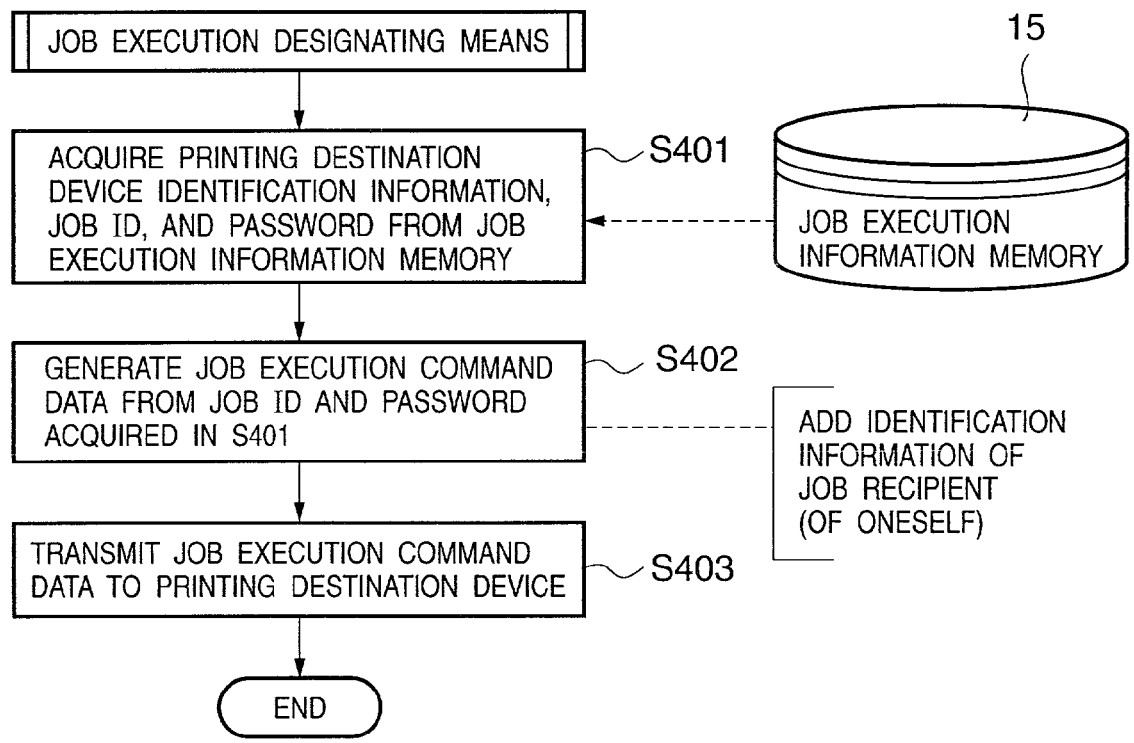
FIG. 8 is a flow chart showing the flow of processing of a job execution designating means according to the first embodiment.

The job execution designating means (of the PC 103) will be described below with reference to a flow chart in FIG. 8.

In step S401, the printing destination device identification information, job ID, and password are acquired from the job execution information memory 15.

In step S402, job execution designation command data is generated on the basis of these pieces of acquired information and identification information of job recipient=user B.

Figure 20:
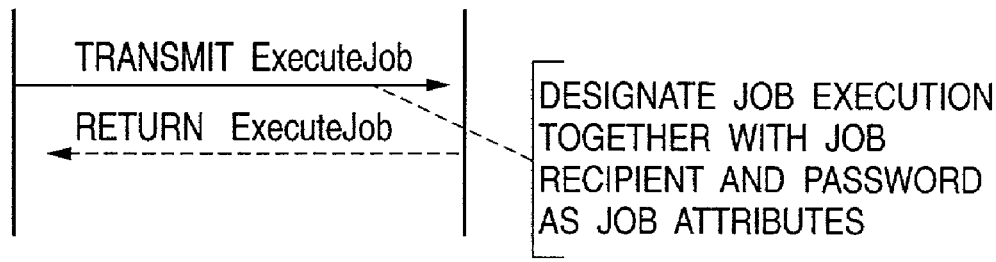
FIG. 20 is a view showing the transmission sequence of command data when job execution is designated.

In step S403, this job execution designation command data is transmitted to the printing destination device (printer 102). The data structure of the job execution designation command data is shown in FIGS. 12, 17, and 18, and the transmission sequence of this data is shown in FIG. 20.

Figure 21:
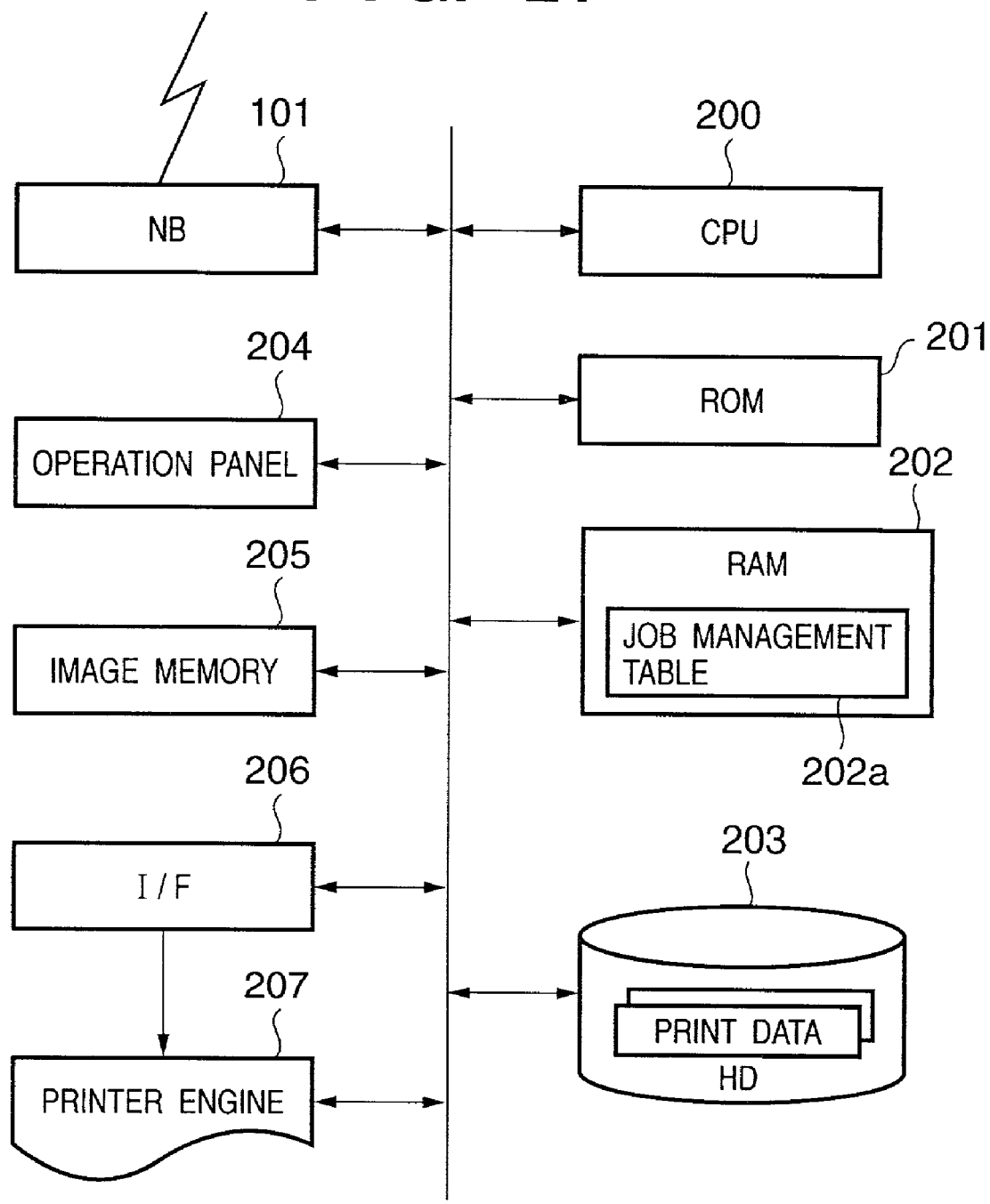
FIG. 21 is a block diagram of a printer according to the first embodiment.

The printer 102 has, e.g., an arrangement as shown in FIG. 21.

Referring to FIG. 21, a CPU 200 controls the overall apparatus. A ROM 201 stores font data in addition to the program as the printing procedure and the job management program according to the embodiment. A RAM 202 is used as a work area of the CPU 200 and has a job management table 202a as shown in FIG. 21. A hard disk 203 stores print data as files. Reference numeral 101 denotes the NB explained earlier. An operation panel 204 has switches for setting various conditions and a display operation panel for displaying messages and the like. An image memory 205 bitmaps an image when printing is performed. Reference numeral 206 denotes a printer engine interface; and 207, a printer engine.

FIG. 22 is a view showing the contents of the job management table. In this job management table as shown in FIG. 22, one row corresponds to one job, and each row is composed of the job ID, the reception time, the issuer (the user A in the above embodiment), the password set by the user A, the recipient (a plurality of recipients are permitted), and the print data file name stored as a file in the HD 203.

In this printer 102, a plurality of recipients can be set for one job. The column of recipient, therefore, stores information specifying a plurality of recipients and has a flag which indicates, when printing designation is received from each recipient, whether printing is completed for that recipient. Referring to FIG. 22, three recipients AAA, BBB, and CCC exist, and "0" is set to indicate the state in which no printing designation is sent from any recipient. If printing designation is sent from the user AAA, for example, a flag for this user AAA is set to "1" when the printing is completed. When flags for all the users are set to "1", the corresponding job is erased from the job management table 202a, and the file (print data) stored in the HD 203 is deleted.

In the above arrangement, when receiving a print job from the network, the printer 102 adds the job to the job management table 202a on the basis of information contained in the job, and stores print data as the entity into the hard disk 203 as a file.

When job execution designation (which can be discriminated by checking the header) is supplied from the network, an authentication process is performed to check whether the job ID, password, and request source information contained in the designation are present in the stored management table. A job passing this authentication process is printed.

In this embodiment with the above arrangement, when the user A is to transfer a document across the network to the user B, data in a format to be output from a printer is directly transmitted to the printer, and the user B simply operates the printer to print out the data. Accordingly, the application used by the user A need not be installed on the PC used by the user B as the recipient. Also, since documents are transmitted not as printed papers but in the form of electronic data, they can be exchanged at low cost.

Second Embodiment

In the above first embodiment, pieces of information such as a job ID and password necessary for job authentication and job execution designation are transmitted as a "job issue notification" from job issuer=PC 111 to job recipient=PC 103, and the job recipient generates job execution designation command data.

In this second embodiment, job issuer=PC 111 generates job execution designation command data. That is, a job recipient does not perform a job execution designation command generating process but simply outputs a job execution designation command transmitted from an issuer to a printer.

The configuration of job generation software according to the execution environment is the same as the first embodiment.

The details of each means in this embodiment will be described below.

Figure 9:
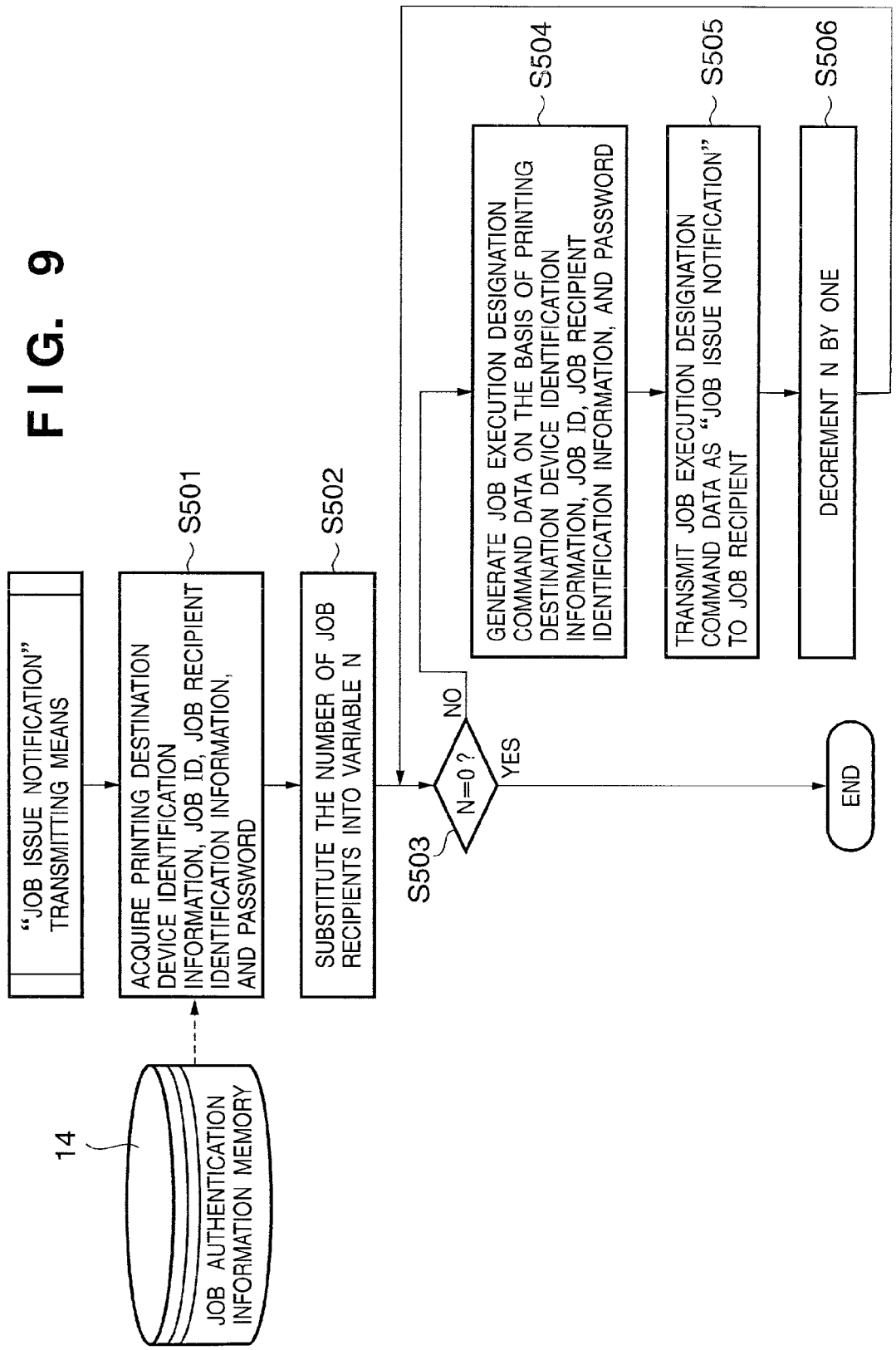
FIG. 9 is a flow chart showing the flow of processing of a "job issue notification" transmitting means according to the second embodiment.

A job issuing means is the same as the first embodiment (see the flow chart in FIG. 5 and the first embodiment). First, therefore, a "job issue notification" transmitting means will be explained with reference to a flow chart in FIG. 9.

In step S501, printing destination device identification information, a job ID, job recipient identification information, and a password are acquired from a job authentication information memory 14.

In step S502, the number of job recipients is substituted into a variable N. If N≠0 in step S503, step S504 is executed. If N=0 in step S503, this means is terminated. In step S504, job execution designation command data is generated for a job recipient on the basis of the printing destination device identification information, job ID, and password (details of the data structure of this job execution designation command data are shown in FIGS. 12, 17, and 18).

In step S505, the job execution designation command data is transmitted as a "job issue notification" across the network. A practical method of transmitting the "job issue notification" across the network is accomplished by using e-mail or messaging service of the server or the user group.

In step S506, the variable N is decremented by one, and the flow returns to step S503.

Figure 10:
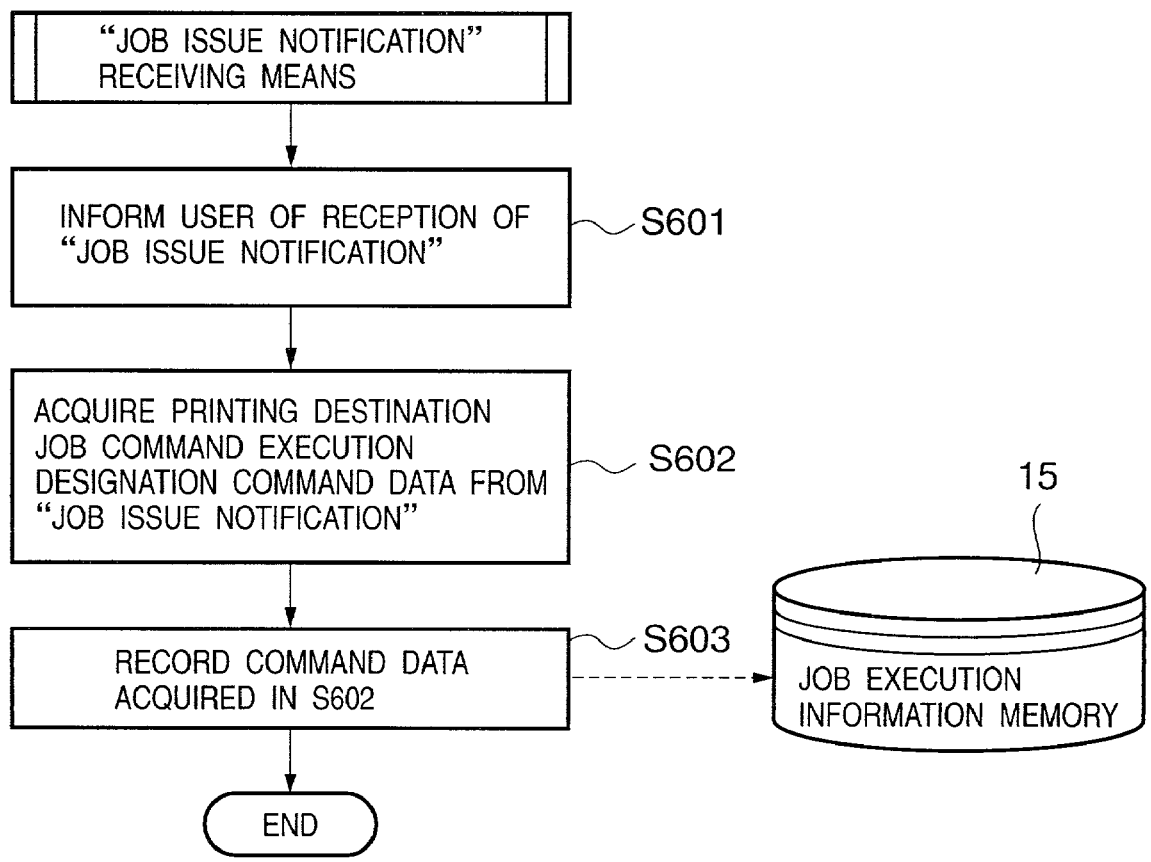
FIG. 10 is a flow chart showing the flow of processing of a "job issue notification" receiving means according to the second embodiment.

A "job issue notification" receiving means will be described below with reference to a flow chart in FIG. 10.

In step S601, information indicating that the "job issue notification" is received is displayed to a user B. In step S602, the job execution designation command data is acquired from the received "job issue notification". In step S603, the acquired job execution designation command data is recorded in a job execution information memory 15.

Figure 11:
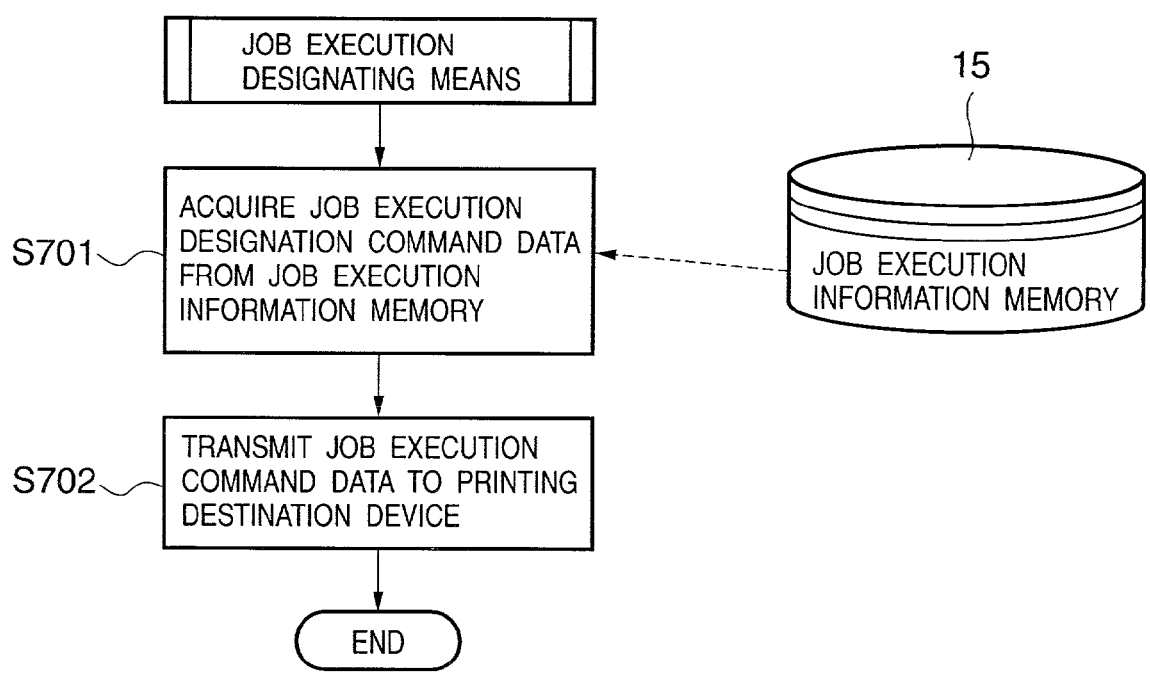
FIG. 11 is a flow chart showing the flow of processing of a job execution designating means according to the second embodiment.

A job execution designating means will be described below with reference to a flow chart in FIG. 11.

In step S701, the job execution designation command data is acquired from the job execution information memory 15. In step S702, this job execution designation command data is transmitted to the printing destination device. The transmission sequence of the job execution designation command data is as shown in FIG. 20.

In the second embodiment as described above, the same effects as in the first embodiment are achieved, and the processing on the receiving side is simplified.

Third Embodiment

In the above first and second embodiments, data is finally printed out when a recipient designates the printing. That is, once an issuer has issued a print job, a recipient alone can manage the job without allowing any intervention by the issuer. Also, jobs sometimes build up in a printer.

This third embodiment solves these problems.

For the sake of descriptive simplicity, assume that a network configuration is the same as FIG. 2, a job issuer is a PC 111, a recipient is a PC 103, and a printer for actually print data is a printer 102.

<<Configuration of Job Generation Software>>

The configuration of job generation software in this third embodiment will be described below.

Figure 23:
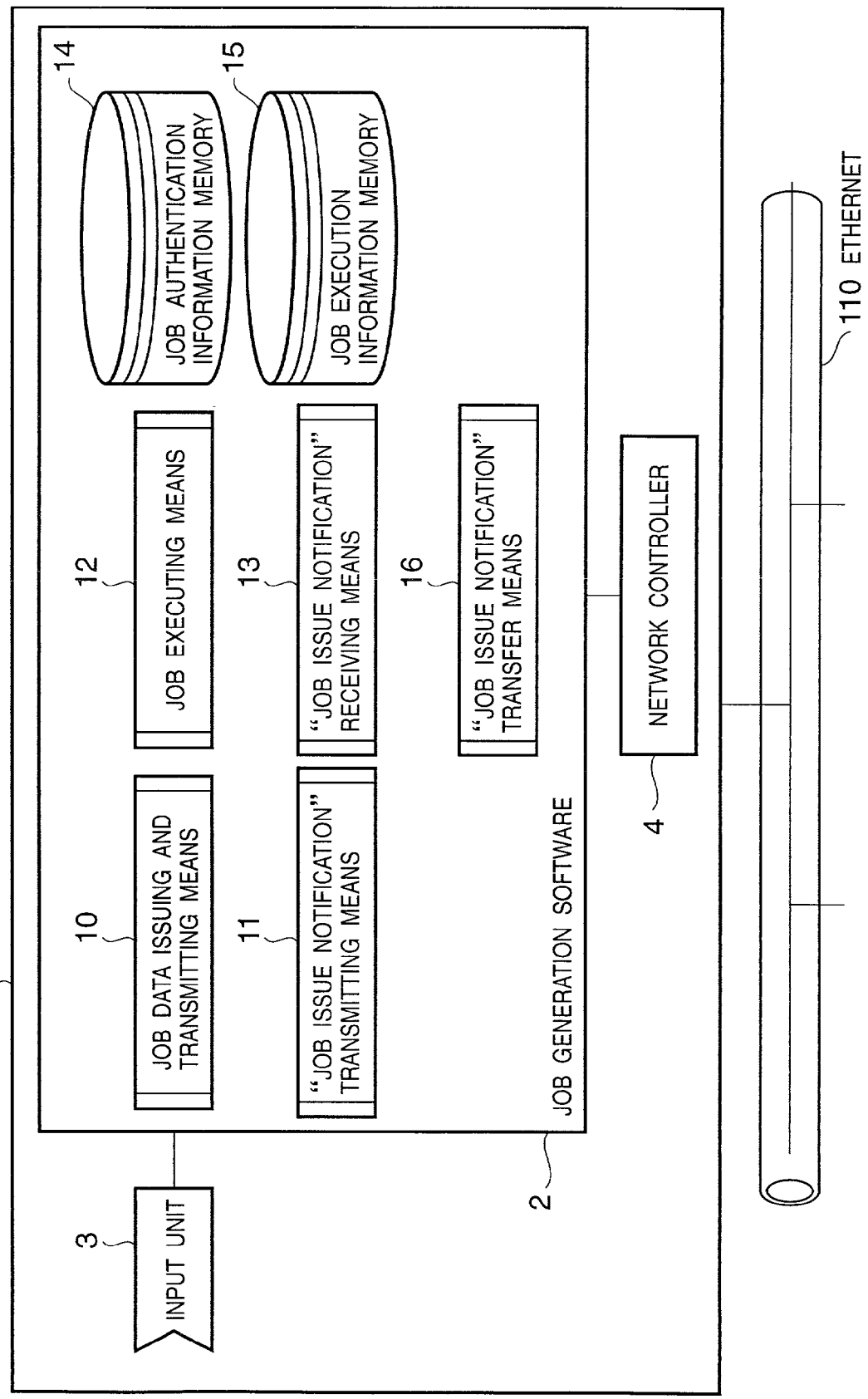
FIG. 23 is a conceptual view showing job generation software and its peripheral operation environment according to the third embodiment.
Figure 24:
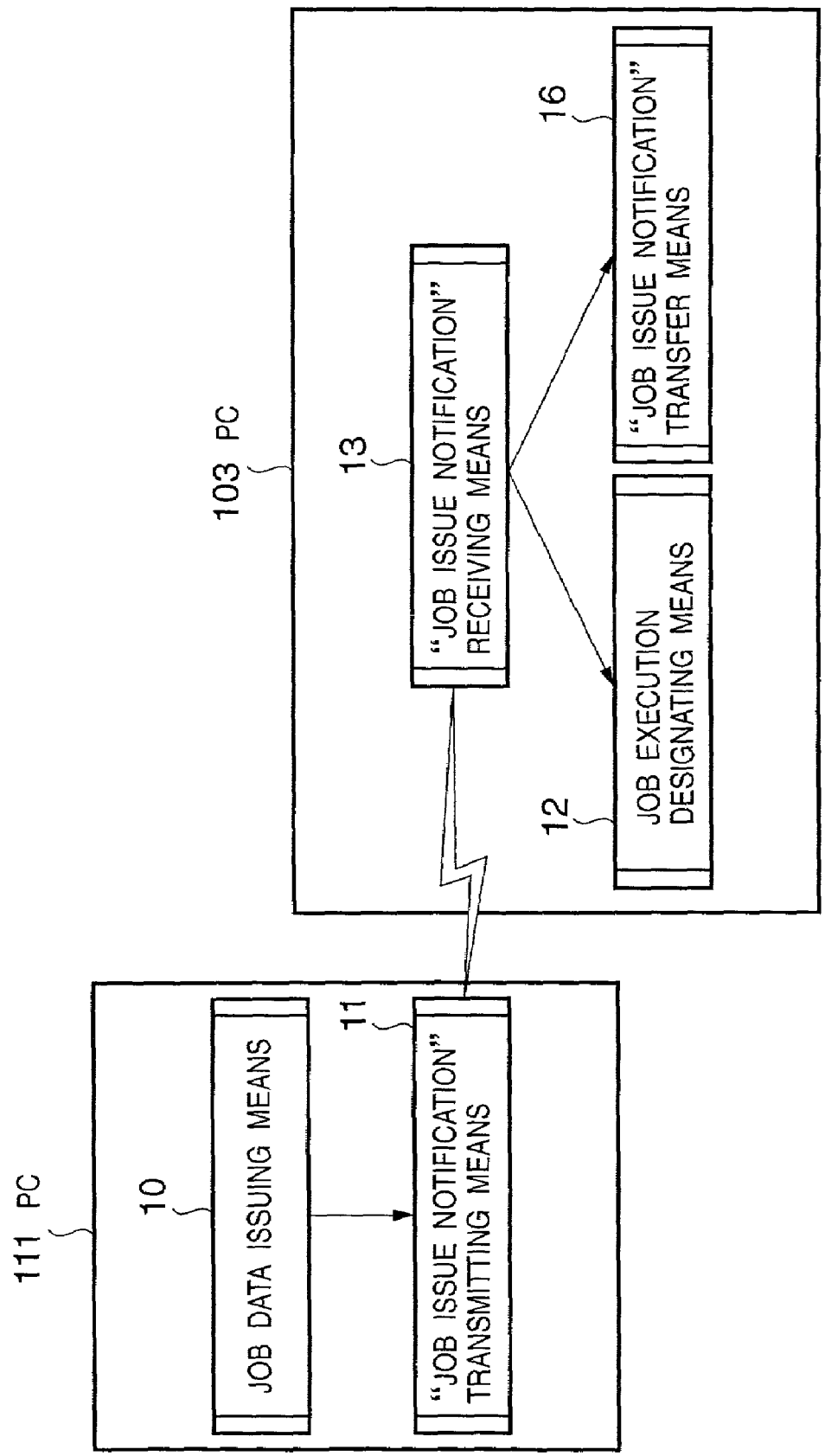
FIG. 24 is a schematic view showing the operation relationship of the job generation software according to the third embodiment.

FIG. 23 is a conceptual view according to the third embodiment, which shows the PC 111 as the job generation software and its peripheral functional portions. A difference from the first embodiment (FIG. 1) is that a "job issue notification" transfer means is added. That is, the software installed in the PC 111 is composed of:

A job issuing means 10
A "job issue notification" transmitting means 11
A "job issue notification" receiving means 12
A job execution designating means 13
A job authentication information memory 14
A job execution information memory 15
The "job issue notification" transfer means 16

In this third embodiment, as shown in FIG. 4, the PC 111 executes the job issuing means 10 and the "job issue notification" transmitting means 11 in this order, and the PC 103 executes the "job issue notification" receiving means 12 and, in accordance with user's discretion, executes the job execution designating means 13 or the "job issue notification" transfer means 16. At the PC 111, a user A as a job issuer issues a job to a user B. At the PC 103, the user B as a job recipient designates execution of printing of the job or transfer of a "job issue notification".

The details of the contents of the processing of each means will be explained below.

Figure 25:
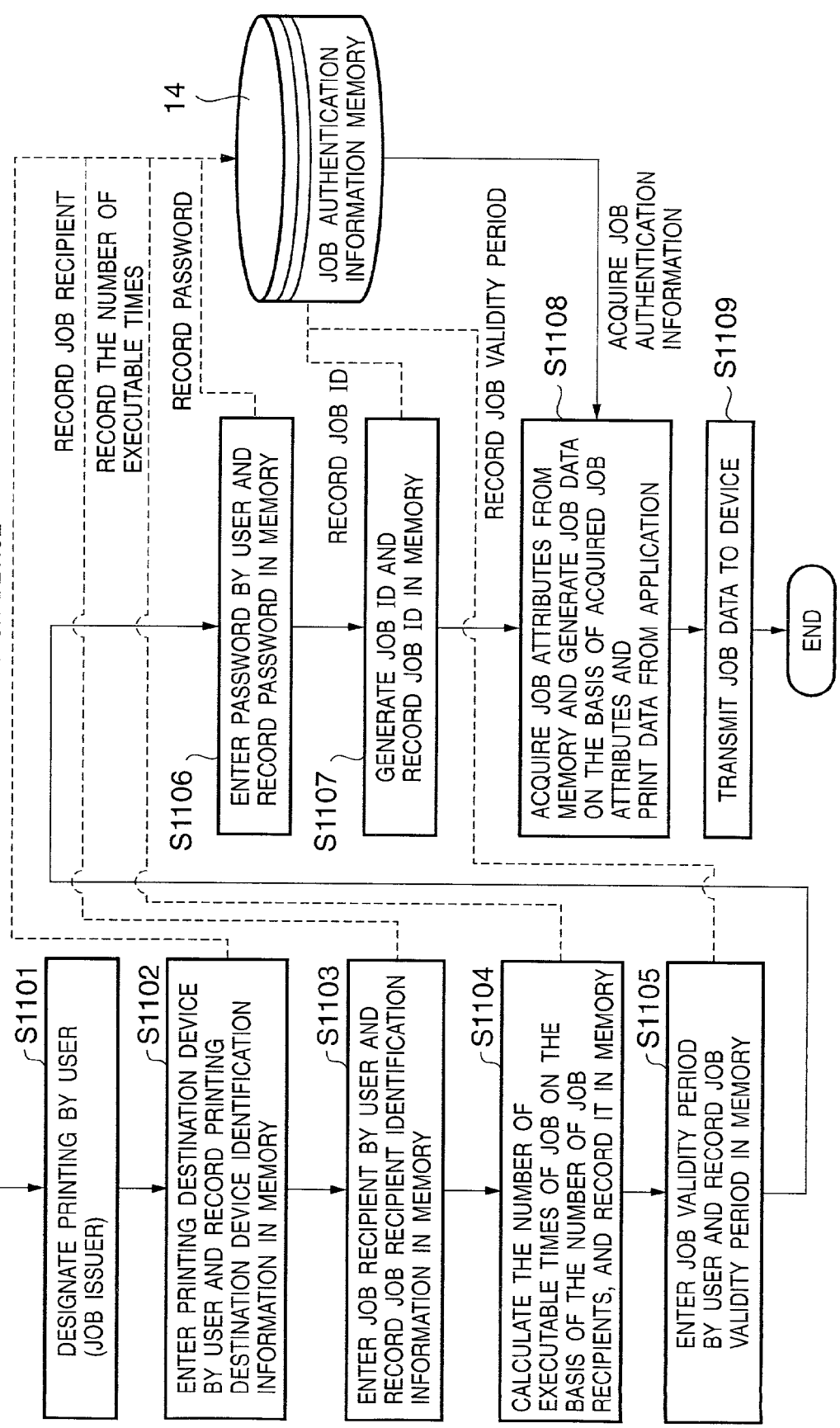
FIG. 25 is a flow chart showing the flow of processing of a job issuing means according to the third embodiment.

A flow chart in FIG. 25 shows the procedure in the job issuing means.

First, in step S1101, job issue designation (on an application currently being used) by user A=job issuer is input from a KBC 505. In the following description, any input from the user A is executed from the KBC 505.

In step S1102, the user A enters information for identifying a device (in this case, the printer 102) as a transmission destination (printing destination) of the job data, and this printing destination device identification information is recorded in the job authentication information memory 14. As the printing destination device identification information, the IP address of the printing destination device or the name (if DNS is available) of the device on the network is used.

In step S1103, the user A designates the recipient of the job and enters job recipient identification information, and this job recipient identification information is recorded in the job authentication information memory 14. To designate the job recipient, e-mail address book information or a list of network login names registered in, e.g., the server or the user group is used. As the job recipient identification information, an e-mail address or a login name is used. Note that a plurality of job recipients can be designated.

In step S1104, the number of executable times of the job is calculated on the basis of the input number of job recipients, and recorded in the job authentication information memory 14. In step S1105, the user A enters the validity period of the job, and this job validity period is recorded in the job authentication information memory 14. In step S1106, the user A enters an arbitrary password for executing the job, and this password is recorded in the job authentication information memory 14.

In step S1107, a job ID for identifying the job currently being issued is generated and recorded in the job authentication information memory 14.

In step S1108, job data is issued on the basis of a data main body to be printed, the above diverse pieces of information recorded in the job authentication information memory 14, and other job attributes (e.g., job issuer identification information and the job generation date and time). In step S1109, this job data is transmitted to the printing destination device (printer 102). The data structure of the job data issued in step S1108 is as shown in FIGS. 13 to 17, 29, and 30, and the transmission sequence executed in step S1109 is as shown in FIG. 19.

The transmitted job data is stored in the printer 102. This job data is eliminated (erased) from the printer 102 when the input job validity period expires or when the number of executable times of the job becomes 0.

The "job issue notification" transmitting means of this third embodiment is the same as the first embodiment, so the details of this means are described in the first embodiment.

Figure 26:
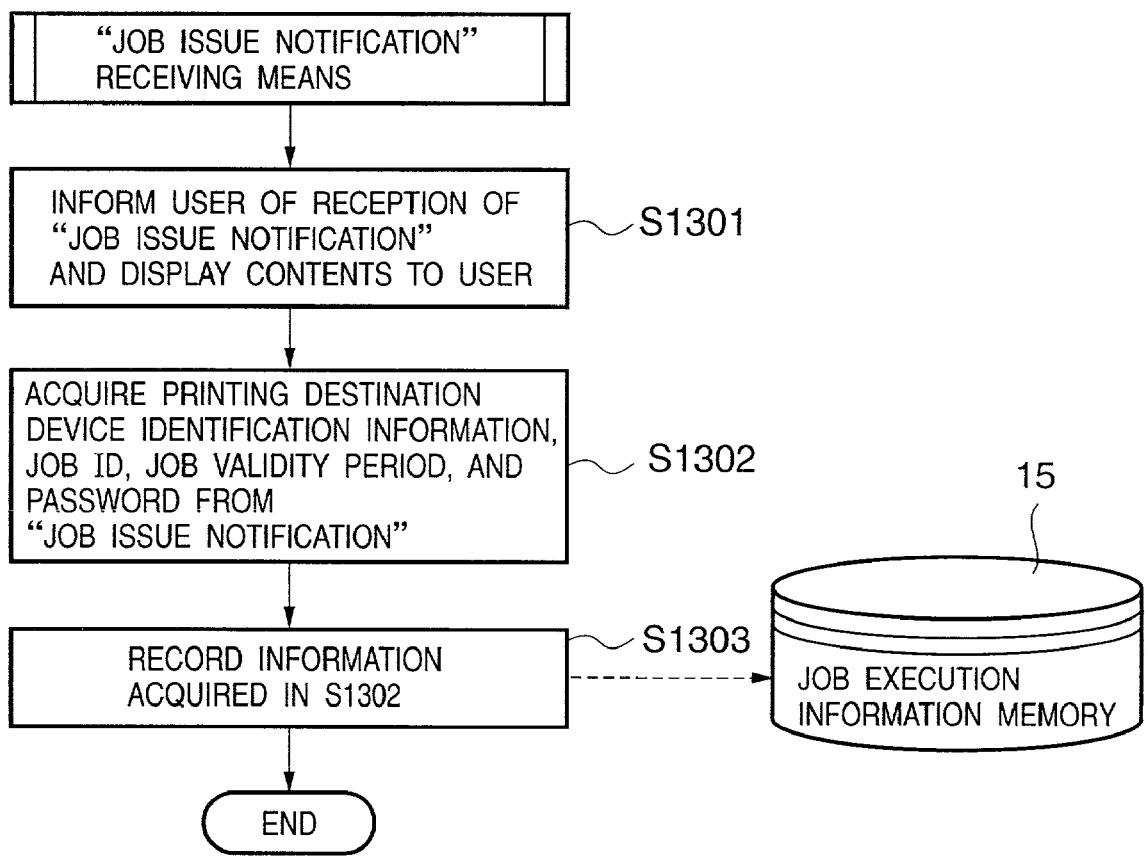
FIG. 26 is a flow chart showing the flow of processing of a "job issue notification" receiving means according to the third embodiment.

The "job issue notification" receiving means (processing in the PC 103) will be described below with reference to a flow chart in FIG. 26.

In step S1301, information indicating that the "job issue notification" is received is displayed to the user B. In step S1302, the printing destination device identification information, job ID, job validity period, and password are acquired from the received "job issue notification".

In step S1303, these pieces of acquired information are recorded in the job execution information memory 15.

Figure 27:
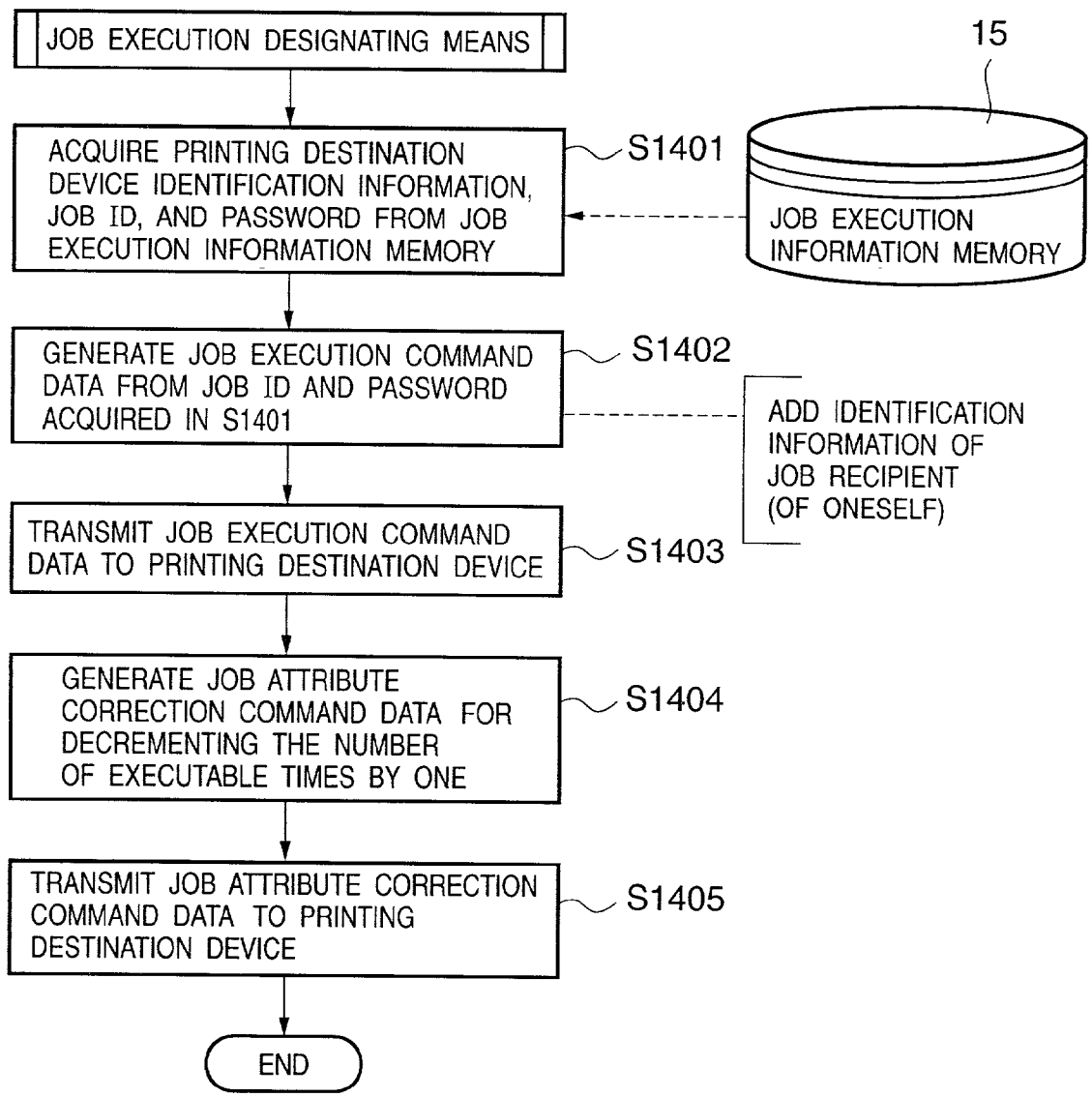
FIG. 27 is a flow chart showing the flow of processing of a job execution designating means according to the third embodiment.

The job execution designating means (of the PC 103) will be described below with reference to a flow chart in FIG. 27.

In step S1401, the printing destination device identification information, job ID, and password are acquired from the job execution information memory 15. In step S1402, job execution designation command data is generated on the basis of these pieces of acquired information and identification information of job recipient=user B. In step S1403, this job execution designation command data is transmitted to the printing destination device. In step S1404, job attribute correction command data is generated to reduce the number of executable times of the job by one. Finally, in step S1405, this job attribute correction command data is transmitted to the printing destination device.

Figure 32:
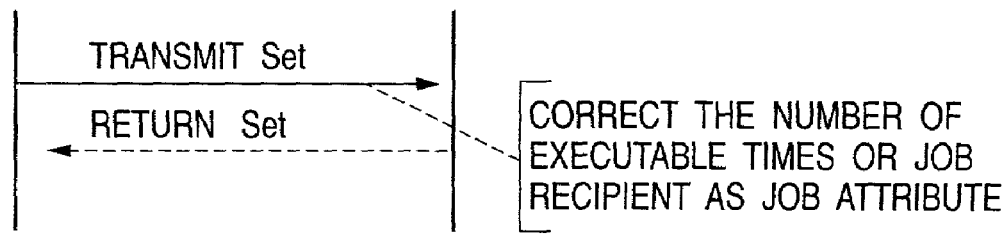
FIG. 32 is a view showing the transmission sequence of command data when a job attribute is corrected according to the third embodiment.

The data structures of the job execution designation command data and the job attribute correction command data are as shown in FIGS. 13 to 17, 29, and 30. The transmission sequences of these data are as shown in FIGS. 20 and 32.

Figure 28:
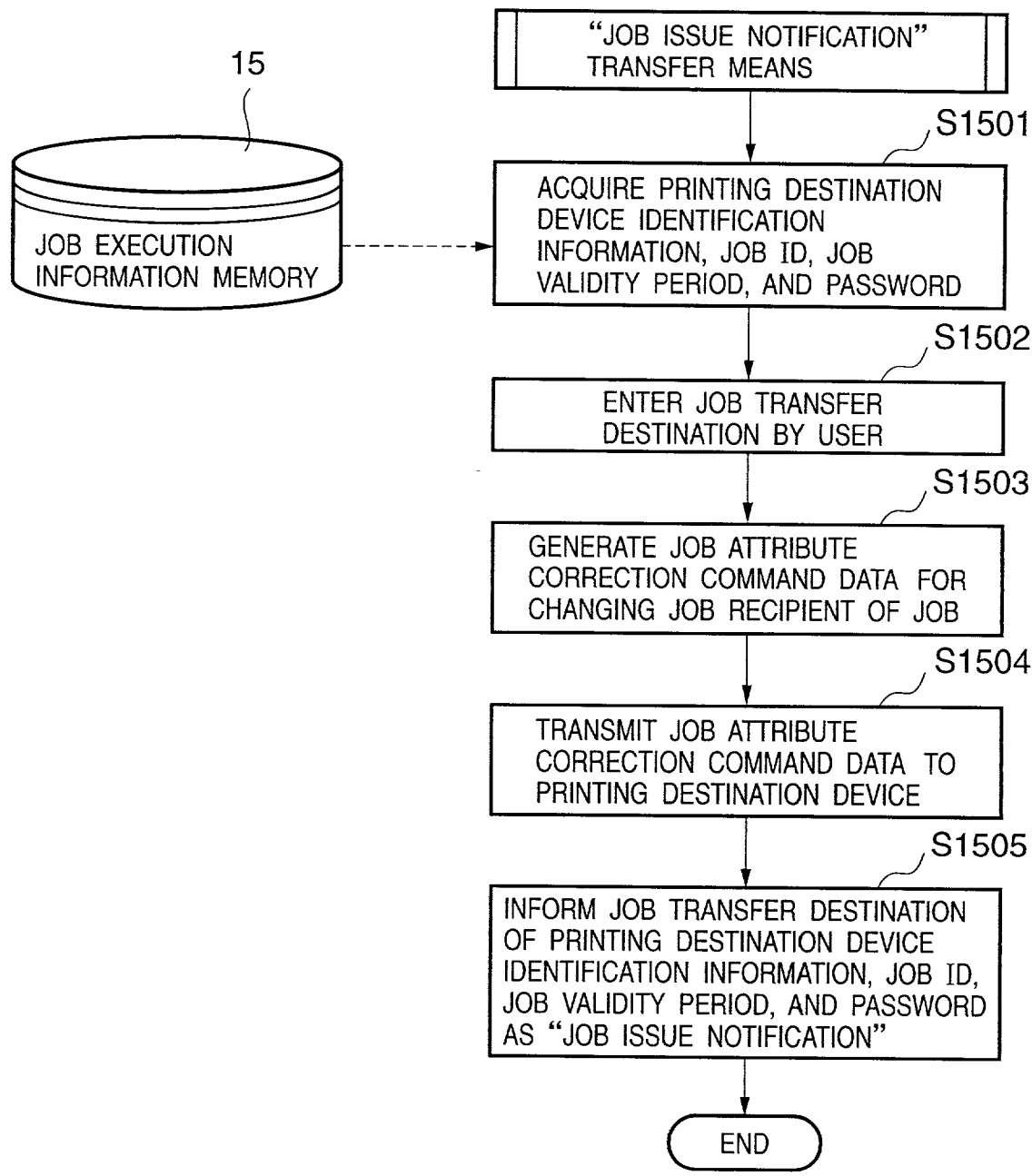
FIG. 28 is a flow chart showing the flow of processing of a job transfer means according to the third embodiment.

The "job issue notification" transfer means will be described below with reference to a flow chart in FIG. 28. This means is a procedure of transferring a "job issue notification" to another user C, when the "job issue notification" is received by the "job issue notification" receiving means.

First, in step S1501, the printing destination identification information, job ID, job validity period, and password are acquired from the job execution information memory 15. In step S1502, the user B enters a job transfer destination.

In step S1503, job attribute correction command data for changing the job recipient of the job is generated.

In step S1504, the job attribute correction command data is transmitted to the printing destination device.

In step S1505, the printing destination device identification information, job ID, and password are transmitted as a "job issue notification" across the network to the job transfer destination. A practical method of transmitting the "job issue notification" across the network is accomplished by using e-mail or messaging service of the server or the user group.

It should be understood from the above processing that only a person who has received a job issue notification can transfer the job issue notification.

The data structure of the job attribute correction command data is as shown in FIGS. 29, 30, and 31, and the transmission sequence of the data is as shown in FIG. 32.

The printer 102 includes a counting mechanism having an internal timer, in addition to the arrangement shown in FIG. 21. Also, a column of a job validity period and a column of a counter variable for counting the number of job execution times are added to a job management table 202*a*.

The current date and time are obtained from the timer and compared with the validity period of each job. A job whose validity period has expired is erased from the memory. When a job execution command is received, a job matching data contained in the command is loaded and executed (printing based on the corresponding print data is performed).

When a job attribute correction command is received, a corresponding record in the table, which corresponds to a portion to be corrected contained in the command is corrected. For example, if a command indicating decrement of the number of job execution times is received, a counter variable of the corresponding job is decremented by "1", and the job is deleted when the variable becomes "0". Also, if a command indicating a change of job recipients is received, a recipient chosen to be removed is erased from the record of recipients in the job management table, and a new recipient chosen to be added is registered.

Figure 33:
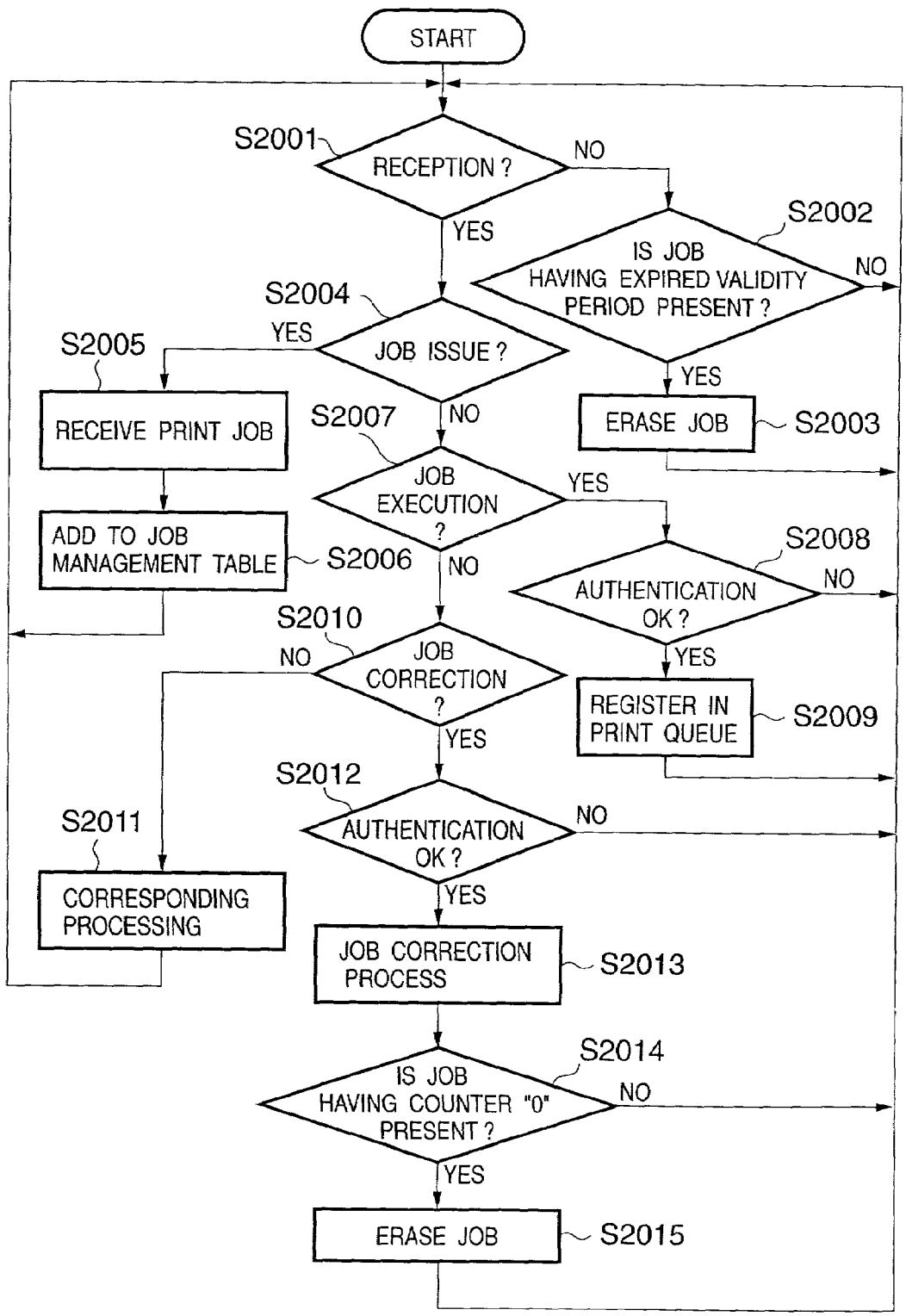
FIG. 33 is a flow chart showing the operation procedure of a printer according to the third embodiment.

A practical processing example is as shown in FIG. 33.

First, in step S2001, whether information is received from the network is checked. If NO in step S2001, the flow advances to step S2002, and the time of the timer is compared with the validity period of each job registered in the management table 202*a* to check whether there is a job whose validity period has expired. If these is a job whose validity period has expired, the flow advances to step S2003 to delete the job from the management table 202*a* and delete the print data file from an HD 203.

If it is determined in step S2001 that certain information is received, the flow advances to step S2004 to check whether the information is job issue data. If YES in step S2004, the flow advances to step S2005 to receive the job and store its print data as a file into the HD 203. In step S2006, the job is registered in the job management table 202*a*.

If it is determined in step S2004 that the information is not job issue data, the flow advances to step S2007 to check whether the information is a job execution command. If the information is found to be a job execution command, authentication is performed by checking whether the column of a recipient of a job indicated by a job ID designated by the job execution command contains the transmission source (in the above embodiment, the PC 103) of that command, and whether the passwords match. If this authentication is successful, in step S2009 the job is registered in a print queue.

Although the explanation lacks sequence, assume that in the printer 102 of this embodiment, a processing program which, when jobs are registered in the print queue, performs printing for these jobs in the order of registration is separately running.

If it is determined that the information is not a job execution command, the flow advances from step S2007 to step S2010 to check whether the information is a job correction command. As described previously, a job correction command contains processing such as decrement of the counter and correction of the recipient. If it is determined that the information is not a correction command, the flow advances to step S2011 to perform corresponding processing. If the information is found to be a correction command, the flow advances to step S2012 to check whether the user who has issued the correction command has the right to correct the job to be corrected, in the same manner as in step S2008. The flow then advances to step S2014 to check the job management table 202*a* for a job whose counter is "0". If there is a job, this job is erased in step S2015.

In this third embodiment as described above, a job issuer can set the validity period of a job, in addition to the effects of the first embodiment described earlier. Therefore, jobs do not unlimitedly build up in a printer. This can effectively hold secrecy.

Also, a recipient can give a third party the right to generate a job execution command.

The printer 102 explained in the first to third embodiments described above contains a processing program for implementing the above processing. However, the printer 105 shown in FIG. 2 can be a general printer, the PC 104 to which this printer 105 is connected can function as a print server, and the program of this print server can perform the same processing as the printer 102.

Also, printers are used output devices in the above first to third embodiments. However, these output devices can of course be printer units of facsimile apparatuses or printer units of copying machines connected to a network.

Furthermore, each of the above embodiments can be implemented by software incorporated into a general-purpose information processor such as a personal computer, although hardware such as a network and a card or board to be connected to the network are necessary.

Accordingly, the present invention can also be achieved by supplying a storage medium (or recording medium) recording program codes of software for implementing the functions of the above embodiments to a system or an apparatus, and reading out and executing the program codes stored in the storage medium by a computer (or a CPU or MPU) of the system or apparatus. In this case, the program codes read out from the storage medium implement the functions of the present invention, and the storage medium storing these program codes constitutes the invention. Also, besides the functions of the above embodiments are implemented by executing the readout program codes by the computer, the present invention includes a case where an OS (Operating System) or the like running on the computer performs a part or the whole of actual processing in accordance with designations by the program codes and thereby implements the functions of the above embodiments.

Furthermore, the present invention also includes a case where, after the program codes read out from the storage medium are written in a memory of a function extension board inserted into the computer or of a function extension unit connected to the computer, a CPU or the like of the function extension board or function extension unit performs a part or the whole of actual processing in accordance with designations by the program codes and thereby implements the functions of the above embodiments.

In this embodiment as described above, job data is issued by adding job attributes (particularly identification information of a "job recipient" and a password) necessary to permit execution of a job to the job data, and this job data is transmitted to a device such as a printer. The job attributes necessary to permit execution of the job are transferred as a "job issue notification" from a "job issuer" to the "job recipient". The "job recipient" designates execution of the job by transmitting to the device job execution designation command data to which the job attributes necessary to permit execution of the job are added. This allows the "job recipient" alone to obtain an execution result (e.g., a printout result) at any arbitrary timing. Accordingly, it is possible to provide a system capable of efficiently transferring a target output result only to a "job recipient".

Also, job data is issued by adding to the job data "job attributes (particularly identification information of a "job recipient" and a password) necessary to permit execution of a job" and "job attributes (e.g., the validity period of the job) for managing the life time of the job", and this job data is transmitted to a device such as a printer. The "job attributes necessary to permit execution of the job" and the "job attributes for managing the life time of the job" are transferred as a "job issue notification" from a "job issuer" to the "job recipient". The "job recipient" designates execution of the job by transmitting to the device job execution designation command data to which the "job attributes necessary to permit execution of the job" are added. This allows the "job recipient" alone to obtain an execution result (e.g., a printout result) at any arbitrary timing. In addition, the intention of the job issuer can be reflected on the life time of the issued job. Accordingly, it is possible to provide a system which has a high degree of secrecy and in which the life time of a job in the device is clear.

Furthermore, since a "job recipient" transfers a "job issue notification" to a third party, the portability of an issued job can be further improved. This improves the transmission efficiency of a job between two or three parties.

In the present invention as has been described above, when a first user on a network is to provide information to a second user, the second user can visually output the information even if an information processor used by the second user does not have a function of reading electronic data as a source of the information.

As many apparently widely different embodiments of the present invention can be made without departing from the sprit and scope thereof, it is to be understood that the invention is not limited to the specific embodiments thereof except as defined in the appended claims.

What is claimed is:

1. A job processing system comprising first and second information processors, and an output device, which communicate with each other via a network,
   wherein said first information processor comprises:
   a job issuing unit that transfers to said output device job data, including print data and attribute information that includes authentication information which is used to start outputting the print data; and
   a notifying unit that notifies said second information processor of the attribute information, including the authentication information, for the job data transferred to said output device by said job issuing unit of said first information processor and identification information for identifying said output device to which the attribute information that includes the authentication information is to be sent,
   wherein said second information processor comprises:
   a sending unit that sends the attribute information that includes the authentication information notified to the second information processor by said notifying unit of the first information processor to said output device identified by the notified identification information in response to a user's instruction without the user entering the attribute information that includes the authentication information and identification information, and
   wherein said output device comprises:
   a storage unit that stores the job data which is transferred to said output device by said job issuing unit; and
   a control unit that outputs print data stored in said storage unit if the authentication information included in the attribute information sent to said output device by said sending unit of the second information processor corresponds to the authentication information included in the attribute information stored in said storage unit.

2. The system according to claim 1, wherein said first information processor further comprises a notifying unit which, when said job issuing unit transfers the job data to said output device, notifies a job issue to a user permitted to execute outputting of the print data.

3. The system according to claim 2, wherein said second information processor further comprises an informing unit which, when said notifying unit notifies the job issue, informs the user of the notification, and
   said sending unit sends the attribute information that includes the authentication information for the job data when a predetermined operation is performed.

4. The system according to claim 1, wherein said second information processor further comprises:
   a notifying unit adapted to notify the same information as notified by said notifying unit of the first information processor to another user to be given permission to output the print data; and
   an adding unit adapted to add a user to be given permission to output print data to attributes with respect to said output device.

5. The system according to claim 1, wherein the attribute information issued by said job issuing unit of said first information processor contains an upper-limit number of output times of job data, and
   said output device further comprises an erasing a unit adapted to erase a job when the upper-limit number of output times of the job is reached.

6. The system according to claim 1, wherein the attribute information issued by said job issuing unit of said first information processor contains information concerning a validity period of job data, and
   said output device further comprises art erasing a unit adapted to erase job data whose validity period has expired.

7. A control method of a job processing system comprising first and second information processors, and an output device, which communicate with each other via a network,
   wherein said first information processor performs:
   a job issuing step of transferring to said output device job data, including print data and attribute information that includes authentication information which is used to start outputting the print data; and
   a notifying step of notifying said second information processor of the attribute information that includes the authentication information for the job data transferred to said output device by said job issuing step of said first information processor and identification information for identifying said output device to which the attribute information that includes the authentication information is to be sent, wherein said second information processor performs:

a sending step of sending the attribute information which includes the authentication information notified to the second information processor by said notifying step of the first information processor to said output device identified by the notified identification information in response to a user's instruction without the user entering the attribute information that includes the authentication information and identification information, and wherein said output device performs:

a storage step of storing the job data which is transferred to the output device by the job issuing step; and a control step of outputting print data stored in the storage step if the authentication information included in the attribute information sent to the output device in the sending step by the second information processor corresponds to the authentication information included in the attribute information stored in said storage step.

8. A network system comprising:

first and second information processors provided on a network, said first information processor comprising:

a job issuing unit constructed to convert information to be output, transferred from high-order processing, into data suited to an output device, and to transfer to said output device job data, including the converted data and attribute information that includes authentication information attached thereto which is used to start outputting the converted data; and a notifying unit constructed to notify said second information processor of the attribute information that includes the authentication information for the job data transferred to said output device by said job issuing unit of said first information processor and identification information for identifying said output device to which the attribute information that includes the authentication information is to be sent, and said second information processor comprising:

a sending unit constructed to send the attribute information that includes the authentication information notified to the second information processor by said notifying unit of the first information processor to said output device identified by the notified identification information, in response to a user's instruction without the user entering the attribute information that includes the authentication information and identification information, wherein said output device starts processing for the job data if the authentication information included in the attribute information sent to the output device by the sending unit of the second information processor matches the authentication information included in the attribute information included in the job data sent to the output device by the first information processor.

9. A control method of a network system comprising an output device which stores externally received job data and starts processing for the job data when receiving authentication information included in attribute information matching authentication information included in attribute information of the stored job data, and first and second information processors, wherein said first information processor performs:

a job issuing step of converting information to be output into data suited to said output device, and transferring to said output device job data, including the converted data and attribute information that includes authentication information attached thereto which is used to start outputting the converted data; and a notifying step of notifying said second information processor of the attribute information that includes the authentication information for the job data transferred to said output device by said job issuing step of said first information processor and identification information for identifying said output device to which the attribute information that includes the authentication information is to be sent, and wherein said second information processor comprises:

a sending step of sending the attribute information that includes the authentication information notified to the second information processor by the notifying step of the first information processor to said output device identified by the notified identification information, in response to a user's instruction without the user entering the attribute information that includes the authentication information and identification information.

10. A printing apparatus connected to a network, comprising:

a first receiving unit that receives, from a first client terminal on said network, print data and authentication information for executing printing of the print data;

a storage unit that stores the received print data and authentication information;

a second receiving unit that receives, from a second client terminal on said network, authentication information which the first client terminal has sent to the second client terminal together with identification information for identifying the printing apparatus, the second client terminal sending the authentication information to the printing apparatus identified by the identification information in response to a user's instruction without the user entering the authentication information and the identification information; and a printing unit that prints, when the authentication information received by said second receiving unit from the second client terminal corresponds to the authentication information received by said first receiving unit, the print data stored in the storage unit which corresponds to the authentication information.

11. The printing apparatus according to claim 10, further comprising:

a print job managing unit that stores and manages the authentication information for the received print data;

wherein said first receiving unit farther receives information for specifying said second client terminal, wherein said print job managing unit stores and manages information for specifying said second client terminal together with the authentication information, and said printing unit performs printing when a client as a transmission source of authentication information received by said second receiving unit is said second client terminal stored and managed by said print job managing unit.

12. The printing apparatus according to claim 11, wherein said print job managing unit stores information for specifying a plurality of second client terminals for one print data.

13. The printing apparatus according to claim 12, further comprising a receiving unit that receives authentication information from all second client terminals for one print job, and erases information concerning the print job from said storage unit when printing is performed.

14. A control method of a printing apparatus connected to a network, comprising:
- a first receiving step of receiving, from a first client terminal on the network, print data and authentication information for executing printing of the print data;
- a storage step of storing the received print data and the authentication information into a predetermined memory;
- a second receiving step of receiving, from a second client terminal on said network, authentication information which the first client terminal has sent to the second client terminal together with identification information for identifying the printing apparatus, the second client terminal sending the authentication information to the printing apparatus identified by the identification information in response to a user's instruction without the user entering the attribute information and identification information; and
- a printing step of, when the authentication information received in the second receiving step corresponds to the authentication information received in the first receiving step, printing the print data stored in the storage step which corresponds to the authentication information.

15. The method according to claim 14, further comprising:
- a print job managing step of storing and managing the authentication information for the received print data;
- wherein in the first receiving step, information for specifying said second client terminal is further received,
- wherein in the print job managing step, information for specifying said second client terminal is stored and managed together with the authentication information, and
- in the printing step, printing is performed when a client as a transmission source of authentication information received in the second receiving step is said second client terminal stored and managed in the print job managing step.

16. The method according to claim 15, wherein, in the print job managing step, information for specifying a plurality of second client terminals for one print data is stored.

17. The method according to claim 16, further comprising a step of receiving authentication information from all second client terminals for one print job, and erasing information concerning the print job from said memory when printing is performed.

* * * * *

UNITED STATES PATENT AND TRADEMARK OFFICE
CERTIFICATE OF CORRECTION

PATENT NO. : 7,304,752 B2 Page 1 of 1
APPLICATION NO. : 09/826938
DATED : December 4, 2007
INVENTOR(S) : Mizuno It is certified that error appears in the above-identified patent and that said Letters Patent is hereby corrected as shown below:

DRAWINGS:
 Sheet 18, FIG. 18, "id_att_job_passward" should read
-- id_att_job_password --; and
 Sheet 31, FIG. 31, "id_att_job_passward" should read
-- id_att_job_password --.

COLUMN 4:
 Line 5, "these" should read -- These --.

COLUMN 9:
 Line 6, "actually" should read -- actual --.

COLUMN 11:
 Line 40, "these" should read -- there --.

COLUMN 14:
 Line 41, "a" should be deleted; and
 Line 48, "art" should read -- an --, and "a" should be deleted.

Signed and Sealed this

Twenty-ninth Day of July, 2008

JON W. DUDAS
*Director of the United States Patent and Trademark Office*